US012342430B2

(12) United States Patent
Song et al.

(10) Patent No.: US 12,342,430 B2
(45) Date of Patent: Jun. 24, 2025

(54) MICROLED ARRAY WITH ADAPTIVE PWM PHASE SHIFT

(71) Applicant: Lumileds LLC, San Jose, CA (US)

(72) Inventors: Zhi Hua Song, Palo Alto, CA (US); Ronald Johannes Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 387 days.

(21) Appl. No.: 17/785,344

(22) PCT Filed: Dec. 18, 2020

(86) PCT No.: PCT/US2020/066173
§ 371 (c)(1),
(2) Date: Jun. 14, 2022

(87) PCT Pub. No.: WO2021/127537
PCT Pub. Date: Jun. 24, 2021

(65) Prior Publication Data
US 2023/0007743 A1 Jan. 5, 2023

Related U.S. Application Data

(60) Provisional application No. 62/951,199, filed on Dec. 20, 2019.

(51) Int. Cl.
*H05B 45/10* (2020.01)
*H05B 45/325* (2020.01)
*H05B 45/44* (2020.01)

(52) U.S. Cl.
CPC .......... *H05B 45/10* (2020.01); *H05B 45/325* (2020.01); *H05B 45/44* (2020.01)

(58) Field of Classification Search
CPC ....... H05B 45/10; H05B 45/325; H05B 45/44
See application file for complete search history.

(56) References Cited

U.S. PATENT DOCUMENTS 10,789,870 B2 * 9/2020 Kim ...................... G09G 3/006
2005/0184952 A1 * 8/2005 Konno ................ G09G 3/3648 345/102

(Continued)

FOREIGN PATENT DOCUMENTS

EP 3410003 A1 12/2018
WO WO-2012140634 A1 10/2012
WO WO-2021127537 A1 6/2021

OTHER PUBLICATIONS

"International Application Serial No. PCT/US2020/066173, International Preliminary Report on Patentability mailed Feb. 11, 2022", 17 pgs.

(Continued)

*Primary Examiner* — Minh D A
(74) *Attorney, Agent, or Firm* — Schwegman, Lundberg & Woessner, P.A.

(57) ABSTRACT

An approach for controlling pixel turn on and turn off within an LED array is described. Turn-on delays for pixels within the LED array is based on the duty cycles of the pixels. The pixels are grouped based on corresponding duty cycles. The turn-on delay for each pixel is based on the group that includes the pixel, as well as position of the pixel within the group. The LED array is driven by circuitry in a CMOS backplane.

13 Claims, 15 Drawing Sheets

(56) References Cited

U.S. PATENT DOCUMENTS

| | | | | |
|---|---|---|---|---|
| 2012/0105420 | A1* | 5/2012 | Choi | G09G 3/3233 345/212 |
| 2018/0182279 | A1 | 6/2018 | Sakariya et al. | |
| 2019/0114987 | A1 | 4/2019 | Li et al. | |

OTHER PUBLICATIONS

"International Application Serial No. PCT/US2020/066173, International Search Report mailed Mar. 18, 2021", 5 pgs.
"International Application Serial No. PCT/US2020/066173, Written Opinion mailed Mar. 18, 2021", 15 pgs.
"International Application Serial No. PCT/US2020/066173, Written Opinion mailed Nov. 17, 2021", 16 pgs.

* cited by examiner

200

202 202a 202b

| | 1 | 2 | 3 | 4 | 5 |
|---|---|---|---|---|---|
| 1 | 10% | 11% | 12% | 30% | 31% |
| 2 | 50% | 51% | 20% | 40% | 41% |
| 3 | 52% | 53% | 42% | 43% | 32% |
| 4 | 54% | 55% | 13% | 14% | 21% |
| 5 | 22% | 33% | 56% | 57% | 23% |

FIG. 2

400

| Group Number | 1 | 2 | 3 | 4 | 5 |
|---|---|---|---|---|---|
| Duty Cycle Range | 10%-<20% | 20%-<30% | 30%-<40% | 40%-<50% | 50%-<60% |
| Pixel Numbers | 1, 2, 3, 18, 19 | 8, 20, 21, 25 | 4, 5, 15, 22 | 9, 10, 13, 14 | 6, 7, 11, 12, 16, 17, 23, 24 |

402 404 405 408 410 412 414

FIG. 4

MICROLED ARRAY WITH ADAPTIVE PWM PHASE SHIFT

PRIORITY

This application is a U.S. National Stage Filing under 35 U.S.C. 371 from International Application No. PCT/US2020/066173, filed on Dec. 18, 2020, which claims the benefit of priority to U.S. Provisional Patent Application Ser. No. 62/951,199, filed Dec. 20, 2019, which are incorporated herein by reference in their entireties.

TECHNICAL FIELD

The present disclosure relates generally to light-emitting diodes and, more specifically, to power supplies for micro-light-emitting diodes.

BACKGROUND

Micro-light-emitting diode (μLED) array is an emerging technology in lighting and display industries. μLED arrays often include thousands to millions of microscopic light-emitting diode (LED) pixels that can emit light and that can be individually controlled. μLED arrays may provide higher brightness and better energy efficiency than other lighting technologies and display technologies, which can make the μLED arrays desirable for multiple different applications, such as televisions, automotive headlamps, and mobile phones among others.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 illustrates an example table indicating duty cycles for pixels within an μLED array, according to some embodiments of the present disclosure.

FIG. 4 illustrates an example grouping of pixels within an μLED array, according to some embodiments of the present disclosure.

DETAILED DESCRIPTION

Figure 1:
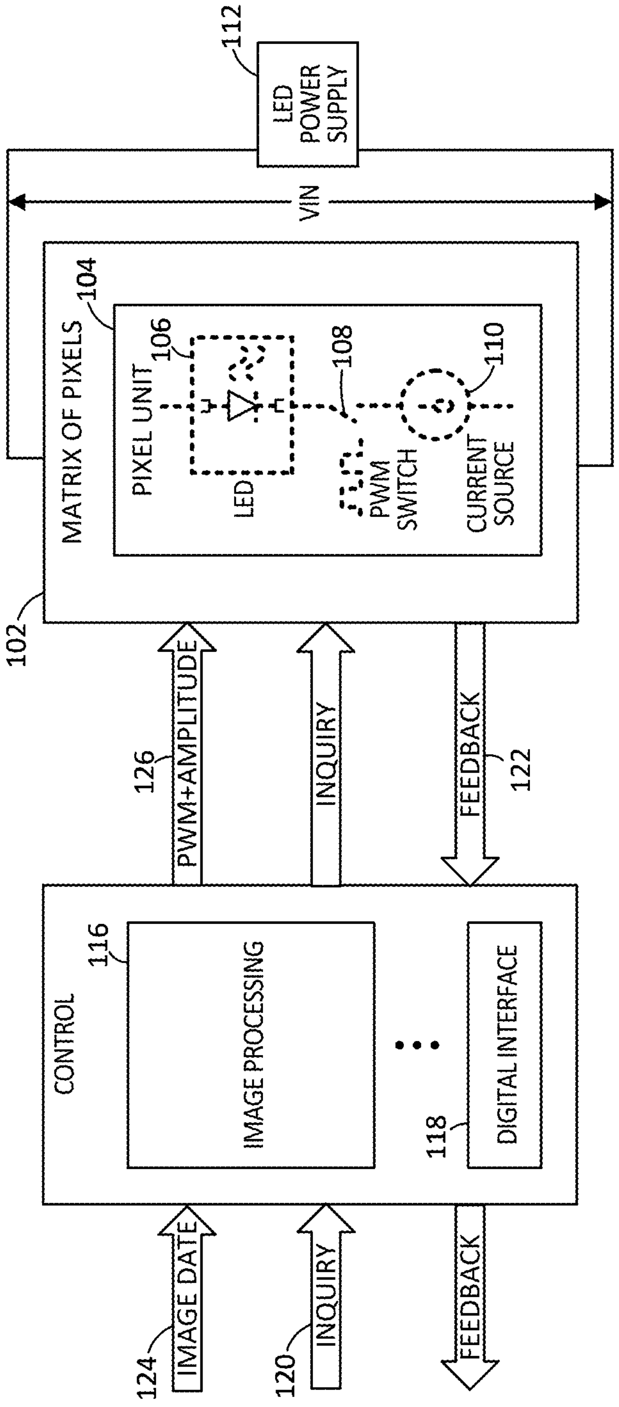
FIG. 1 illustrates an example lighting system, according to some embodiments of the present disclosure.

The systems, methods and devices of this disclosure may include one or more innovative aspects, where the innovative aspects may individually or in combination contribute to the desirable attributes disclosed herein. Details of one or more implementations of the subject matter described in this specification are set forth in the description below and the accompanying drawings.

For purposes of illustrating the procedures for providing proper current levels to pixels for realizing an image as described herein, it might be useful to understand phenomena that may come into play in a headlamp. The following foundational information may be viewed as a basis from which the present disclosure may be properly explained. Such information is offered for purposes of explanation only and, accordingly, should not be construed in any way to limit the broad scope of the present disclosure and its potential applications.

For and μLED array, image data may be provided that defines an image to be displayed by the μLED array. To display and realize the image, the current levels of the pixels within the μLED array may be adjusted accordingly to the image to be produced and/or a light profile. One approach for adjusting the current levels is to utilize pulse width modulation (PWM) dimming. In particular, for PWM dimming the pixels within the μLED array may be turned on and off at a certain frequency and a ratio between the conduction time and the period or cycle time may be adjusted to produce duty cycles for the pixels. For PWM dimming, the average DC current through a pixel of the μLED array may be a product of the current amplitude provided to the pixel and the duty cycle for the pixel.

PWM dimming for adjusting the current levels of pixels in the μLED array may present square-wave shaped pixel current with rich harmonic components. The summed total current of all pixels within the μLED array may also include the harmonic components, which can cause high root-mean-square (RMS) current and resistive losses. Further, electromagnetic interference (EMI) and harmonic noise levels may be high based on the harmonic components. A legacy approach to attempt to address the rich harmonic includes having turn-on delays for the pixels based on the total number of pixels within the μLED array and the position of the pixels within an μLED array. In particular, a period of a cycle of the PWM dimming approach may be divided by a total number of the pixels within the array to determine an amount of delay time between the turn-on of each of the pixels within the μLED array. Each pixel within the μLED array is then turned on in an order defined by the positions of the pixels within the μLED array, where each subsequent turn-on of a pixel in the order is the delay time after the turn-on of the prior pixel in the order. However, this legacy approach may still present rich harmonic components with high RMS current, resistive losses, EMI, and/or harmonic noise levels, especially when pixels with the same or similar duty cycles are located adjacent in the turn-on order of the μLED array. In addition, the increased number of pixels in a μLED array compared to that of a non-μLED array may only serve to exacerbate these issues.

Embodiments of the present disclosure provide an approach for controlling pixel turn on (activation) and turn off (deactivation) within an μLED array. The systems and procedures disclosed herein can define turn-on delays for the pixels within the μLED array based on the duty cycles of the pixels. The pixels can be grouped based on corresponding duty cycles and turn-on delays can be determined for the pixels based on the group that includes each of the pixels.

As will be appreciated by one skilled in the art, aspects of the present disclosure, in particular aspects of pixel turn-on control of μLED arrays, described herein, may be embodied in various manners—e.g, as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g one or more microprocessors, of one or more computers. Although a processor is referred to herein, any logic capable of performing the functions indicated may be used. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing lighting systems, etc.) or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

As used herein, the states of switches may be referred to as "open" and "closed." In some embodiments, a switch may comprise a physical throw, where the term "open" may refer to the throw opening the circuit in which the switch is implemented preventing the flow of current and the term "closed" may refer to the throw completing the circuit in which the switch is implemented allowing the flow of current. In some embodiments, a switch may comprise a transistor, where the term "open" may refer to the transistor presenting a high resistance that allows a minimal amount of current to flow and the term "closed" may refer to the transistor presenting that allows a large amount of current to flow. Further, when referring to a switch comprising a transistor allowing current flow or preventing current flow, it should be understood that current flow when the switch is allowing current flow may be an amount of current flow through the transistor when "closed" and the current flow when the switch is preventing current flow may be an amount of current flow through the transistor when "open"

(which may be non-zero in some instances). It should be understood that the amount of current allowed to the flow through the transistor when "open" and when "closed" can be dependent on the characteristics of the transistor, and the terms "open" and "closed" are to be interpreted as one having ordinary skill in the art would understand when referring to a transistor being utilized as a switch.

As used herein, light-emitting diodes (LEDs), micro-light-emitting diodes (μLEDs), and pixels of μLED arrays may be referred to as being "turned on" and being "turned off." The term "turned on" may refer to the state, or the transition to the state, where current is allowed to flow through the LEDs, the μLEDs, and/or the pixels of the μLED arrays. The term "turned off" may refer to the state, or the transition to the state, where current is prevented from flowing through the LEDs, the μLEDs, and/or the pixels of the μLED arrays. In some embodiments, a μLED array may include thousands or millions of light emitting LEDs positioned together on centimeter scale area substrates or smaller. Each pixel may comprise a μLED as described herein. The μLED arrays can support high density pixels having a lateral dimension of less than about 100 μm by 100 μm. As used herein, a μLED refers to an independently-controllable LED, Alternatively, or in addition, a μLED refers to an LED having lateral dimensions of about 1 to about 100 nm. For example, a μLED array may have lateral dimensions of about 50 μm in diameter or width.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

FIG. 1 illustrates an example lighting system 100, according to some embodiments of the present disclosure. For example, the lighting system 100 may comprise a system utilized in the lighting industry and/or display industry in some embodiments. The lighting system 100 may implemented as part of a larger system, where the lighting system 100 may provide lighting and/or display for the larger system. The lighting system 100 may be implemented as part of a television, an automotive headlamp, or a mobile phone in some embodiments.

The lighting system 100 may include an μLED array 102. The μLED array 102 may include a plurality of pixels of the μLED array 102, where the plurality of pixels may be arranged as a matrix in some embodiments, as illustrated. In some embodiments, the plurality of pixels may be arranged in one or more rows and one or more columns to form a rectangle. In other embodiments, the plurality of pixels may be arranged to form other shapes. The μLED array 102 may include thousands or millions of pixels. For example, the μLED array 102 may include approximately (within 5,000 pixels) 20,000 pixels or more—such as millions of pixels. Each pixel may comprise a μLED as described herein. The μLED array 102 can support high density pixels having a lateral dimension less than 150 μm by 150 μm. In some embodiments, the μLED array 102 may have dimensions of about 50 μm in diameter or width.

Each pixel of the plurality of pixels may comprise a pixel unit. For brevity, a single pixel unit 104 is illustrated and described. It should be understood that each pixel of the plurality of pixels may include a pixel unit, where the pixel unit may include the features of the pixel unit 104. The pixel unit 104 may include a light-emitting diode (LED) 106, a PWM switch 108, and a current source 110. The LED 106 may have sizes in the range of micrometers (i.e., between 1 micrometer (μm) and 100 μm). For example, a pixel size of the LED 106 may have dimensions of approximately (within 10 μm by 10 μm) 40 μm by 40 μm in some embodiments. The pixel size may have a lateral dimension of less than 100 μm in some embodiments.

The LED 106 may comprise a μLED, The LED 106 may emit light when current is applied through the LED 106. An intensity of light emitted by the LED 106 may be dependent on the amount of current applied through the LED 106, For example, the less current applied through the LED 106, the less the intensity of the light emitted by the LED 106. Conversely, the greater the current applied through the LED 106, the greater the intensity of the light emitted by the LED 106.

The PWM switch 108 and the current source 110 may control the amount of current applied through the LED 106. The PWM switch 108 and the current source 110 may work in combination with a power supply 112 coupled to the μLED array 102 to control the amount of current applied through the LED 106. The power supply 112, the current source 110, and the PWM switch 108 may be coupled in series with the LED 106 and may provide the current through the LED 106. In particular, the power supply 112 may apply a voltage, Vin, to the μLED array 102. The current source 110 may be coupled to the power supply 112 and may control the control an amount of current flow being provided by the power supply 112. In some embodiments, the current source 110 may comprise a transistor, where the transistor can control an amount of current based on a state of the transistor. The PWM switch 108 may control whether current is allowed to flow through the LED 106. In particular, when the PWM switch 108 is open, the circuit (including the power supply 112, the current source 110, the PWM switch 108, and the LED 106) may be opened preventing current flow through the LED 106. When the PWM switch 108 is closed, the circuit may be complete allowing current to flow through the LED 106.

The lighting system 100 may further include a control 114 coupled to the μLED array 102. The control 114 may comprise circuitry to perform the procedures of the control 114 described herein. The control 114 may control operation of the μLED array 102. For example, the control 114 may control the state of the PWM switches (such as the PWM switch 108) of the pixel units (such as the pixel unit 104). For example, the control 114 may cause the PWM switch 108 to be opened to prevent to the current flow through the LED 106 and may cause the PWM switch 108 to be closed to allow current through the LED 106.

The control 114 may include an image processor 116 and a digital interface 118 such as $I^2C$, The digital interface 118 may facilitate communication with the control 114. For example, the digital interface 118 may facilitate communication between the control 111 and the) μLED array 102. Further, the digital interface 118 may facilitate communication with the rest of the lighting system 100. For example, the digital interface 118 may facilitate reception of one or more inquiries, such as inquiry 120, from a system in which the lighting system 100 is implemented by the control 114. The inquiries, or a translation thereof, may be transmitted via the digital interface 118 to the matrix of pixels. In response to the inquiries, the μLED array 102 may provide feedback, such as feedback 122. to the control 114 via the digital interface 118. The digital interface 118 may facilitate transmission of the feedback 122, or a translation thereof, to the system in which the lighting system 100 is implemented.

The image processor 116 may process data received by the control 114. For example, the control 114 may receive image data 124, where the image data 124 indicates an image to be displayed by the μLED array 102. The image indicated by the image data 124 may indicate one or more illumination patterns to be displayed by the μLED array 102, a user interface to be displayed by the μLED array 102, intensity of light to be displayed by the μLED array 102, a direction or directions of light to be displayed by the μLED array 102, colors to be displayed by the μLED array 102, portions of the μLED array 102 to emit light, or some combination thereof. The image processor 116 may process the image data 124 and determine characteristics for each of the pixels within the μLED array 102 to cause the image to be displayed. For example, the characteristics may include a PWM duty cycle (which may be referred to as a "PWM duty cycle" or a "duty cycle" throughout this disclosure) and/or an amplitude for each of the pixels within the μLED array 102 to produce the image indicated by the image data 124. The image processor 116 may provide one or more indications of the PWM duty cycles and/or the amplitudes, such as indication 126, for the pixels within the μLED array 102 to the μLED array 102. The indications may comprise one or more signals that can cause the PWM switches of the pixels to turn on and turn off in accordance with the PWM duty cycles for the pixels, and/or may cause the current sources of the pixels to produce currents in accordance with the amplitudes for the pixels.

In response to receiving the indications of the PWM duty cycles and/or the amplitudes, the pixels within the μLED array 102 may operate in accordance with the PWM duty cycles and/or the amplitudes. In particular, the PWM switches (such as the PWM switch 108) for the pixels may turn on and turn off in accordance with the PWM duty cycles of the pixels. Further, the current sources (such as the current source 110) may produce currents corresponding to the amplitudes of the pixels. For example, the pixel unit 104 may receive a signal that can cause the current source 110 to apply a current corresponding to the amplitude for the pixel unit 104. Further, the pixel unit 104 may receive a signal that can cause the PWM switch 108 to turn on and turn off in accordance with the PWM duty cycle. For example, the PWM duty cycle may comprise a percentage of a cycle that the PWM switch 108 is to be turn on, where the signal causes the PWM switch 108 to be turned on for the percentage of the PWM duty and turned off for the rest of the cycle. When the PWM switch 108 is turned on, the current produced by the current source may cause current to flow through the LED 106 causing the LED 106 to emit light. When the PWM switch 108 is turned off, current flow through the LED 106 may be prevented.

In some embodiments an image processing computation may be performed by the image processor 116 through directly generating a modulated image. Alternatively, a standard image file can be processed or otherwise converted to provide modulation to match the image. Image data that mainly contains PWM duty cycle values can be processed for all pixels within the μLED array 102 in the image processor 116. In embodiments in which the amplitude is a fixed value or rarely changed value, amplitude-related commands can be given separately through a simpler digital interface. The control 114 may interpret digital data, which can be used by a PWM generator to generate PWM signals for pixels, and by a Digital-to-Analog Converter (DAC) to generate the control signals for obtaining the required current source amplitude.

FIG. 2 illustrates an example table 200 indicating duty cycles 202 for pixels within an μLED array, according to some embodiments of the present disclosure. For example, the table 200 may indicate duty cycles 202 for an μLED array, such as the μLED array 102 (FIG. 1). The duty cycles 202 may be determined by an image processor (such as the image processor 116 (FIG. 1)) based on image data (such as the image data 124 (FIG. 1)).

The table 200 may indicate an arrangement, or a representation of an arrangement, of pixels within an μLED array. For example, the table 200 indicates the μLED array of the illustrated embodiment may be arranged in, or can be represented by, five columns and five rows. In particular, the μLED array may comprise 25 pixels in the illustrated embodiment, where the pixels may be arranged in five columns and five rows. While μLED arrays may include thousands or millions of pixels in most instances and can be arranged in different arrangements, 25 pixels are illustrated in a rectangle in the embodiment to provide understanding of the subject matter described herein.

The table 200 may indicate the duty cycles 202 for the pixels based on the positions of the pixels within the μLED array. For example, a first duty cycle 202*a* of '10%' may indicate that a pixel located at the first column and the first row of the μLED array should have a duty cycle of 10%. A second duty cycle 202*b* of '11%' may indicate that a pixel located at the second column and the first row of the μLED array should have a duty cycle of 11%. A duty cycle may be provided for each of the pixels within the μLED array in the table 200.

Figure 3:
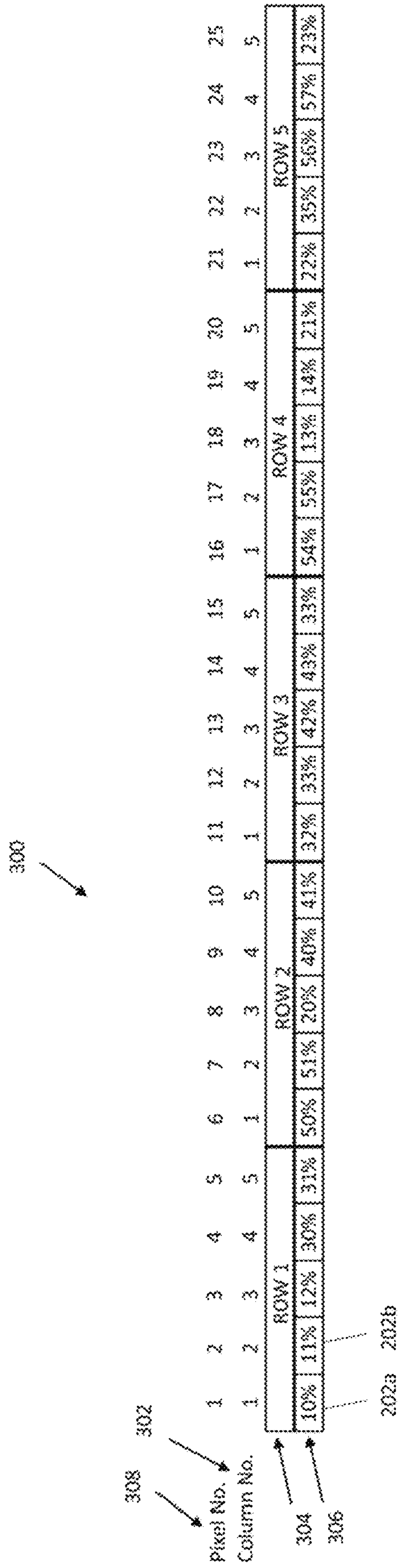
FIG. 3 illustrates an example pixel numbering approach, according to some embodiments of the present disclosure.

FIG. 3 illustrates an example pixel numbering approach 300, according to some embodiments of the present disclosure. In particular, the pixel numbering approach 300 shows pixel numbering for the pixels of the μLED array illustrated in the table 200 of FIG. 2. The pixel numbering in the pixel number approach may be determined by an image processor (such as the image processor 116 (FIG. 1)), where the image processor can assign the pixel numbers to the pixels based on the positions of the pixels within the μLED array.

The pixel numbering approach 300 provides indications of column numbers 302 and indications of row numbers 304 in which each pixel is located. The pixel number approach 300 further provides indications of the pixels 306 ordered based the indications of the column numbers 302 and the indications of the row numbers 304, where each of the pixels is indicated by the corresponding duty cycle in the illustrated embodiment. For example, the pixel located in the first column and the first row in the table 200 that has the first duty cycle 202*a* of '10%' is shown corresponding to the indication of the first column and the indication of the first row in the pixel numbering approach 300. Further, the pixel located in the second column and the second row in the table 200 that has the second duty cycle 202*b* of '11%' is shown corresponding to the indication of the second column and the indication of the first row in the pixel numbering approach 300.

The pixel numbering approach 300 further provides pixel numbers 308 corresponding to the pixels. The pixel numbers 308 may be from '1' to a number of pixels within the μLED array in order. For example, the pixel numbers 308 be from '1' to '25' in the illustrated embodiment. The pixel numbers 308 are assigned in a column-first order in the illustrated embodiment. In particular, pixel number of '1' is assigned to the pixel in the first column and the first row in the illustrated embodiment, as illustrated by the pixel number of '1' being located above the indication of the column number of '1' and the indication of the row number of '1' in the illustrated pixel numbering approach 300. The pixel numbering may proceed assignment in the column-first order with the next pixel number of the pixel numbers 308 being assigned to the pixel in the next column and the same row until there are no longer any pixels left in the same row. When there are no longer any pixels left in the same row, the next pixel number of the pixel numbers 308 may be assigned to the first column in the next row. For example, the pixel number of '2' is assigned to the pixel in the second column and the first row in the illustrated by the pixel number of '2' being located above the indication of the column number of '2' and the indication of the row number of '1' in the illustrated pixel numbering approach 300. The numbering may proceed with numbering the pixels within the first rows until the pixel located at the column number of '5' and the row number of '1' is numbered with the pixel number of '5'. As there are no more pixels left in the number of '1' in the illustrated embodiment, the next pixel number of '6' may be assigned to the pixel at the column number of '1' in the next row, which is the row number of '2' in the illustrated embodiment. Accordingly, the pixel at the column number of '1' and the row number of '2' may be assigned the pixel number of '6' in the illustrated embodiment. The pixel numbering may proceed in the column-first order until all the pixels in the μLED array have been assigned with a pixel number.

While the pixel numbering approach 300 illustrated is shown in a column-first approach, it is to be understood that the pixel numbering of the pixels may be performed in a different order in other embodiments. For example, the pixel numbering of the pixels may be in a row-first approach or any other order that may be conceived in other embodiments. Further, it should be understood that the pixel numbering approach 300 is shown to give an understanding numbering of the pixels within an μLED array, which may be utilized for determining order numbers for turning on pixels within the μLED array as described further throughout this disclosure. Additionally, while numbers are utilized for indicating the pixels in the illustrated embodiments, it should be understood that other indications (such as alphanumeric characters) may be utilized for indicating the pixels in other embodiments, FIG. 4 illustrates an example grouping 400 of pixels within an μLED array, according to some embodiments of the present disclosure. The grouping 400 of the pixels may be performed by an image processor, such as the image processor 116 (FIG. 1), The grouping 400 illustrated may be a grouping of the pixels of the μLED array illustrated by the table 200 (FIG. 2), Further, the grouping 400 employs the pixel numbers 308 (FIG. 3) assigned to the pixels in the pixel number approach 300 (FIG. 3) to refer to the pixels of the μLED array.

The grouping 400 of the pixels may be performed based on the duty cycles of the pixels. For example, the image processor may group the pixels based on the duty cycles of pixels to produce the grouping 400. The image processor may produce a plurality of groups, where each group of the plurality of groups can correspond to a duty cycle range. The pixels may be assigned to the groups based on the duty cycle range determined for the pixels. For example, a pixel with a certain duty cycle may be assigned to a group that has a corresponding duty cycle range that includes the certain duty cycle.

The grouping 400 illustrated includes five groups, as indicated by the group numbers 402. As can be seen, the groups are labeled by consecutive numbers in the illustrated embodiments, although it is to be understood that the groups may be labeled by other indicators in other embodiments. The number of groups may be defined by duty cycle ranges for the groups and/or the duty cycles for the pixels in some embodiments. In other embodiments, a number of groups may be defined, and the duty cycle ranges may be defined based on the number of groups and/or the duty cycles of the pixels. Further, the number of groups may be predetermined, may be based on an indication from a system in which the μLED array is implemented, or may be determined by the image processor based on the duty cycles determined from image data received by the image processor. It should be understood that two or more groups for the grouping 400 may be generated in embodiments.

The grouping 400 includes duty cycle ranges 404 for each of the groups. The duty cycle ranges 404 can indicate the pixels that should be included in each group based on the duty cycles of the pixels. In particular, the duty cycle ranges 404 may indicate that pixels having a duty cycle within the duty cycle ranges 404 should be assigned to the corresponding group of the duty cycle ranges 404. For example, a first group 406 (indicated by group number '1') in the illustrated embodiment may have a corresponding first duty cycle range 408 from 10% to less than 20%. Based on the first duty cycle range 408, the first group 406 should include pixels with duty cycles within the first duty cycle range 408 from 10% to less than 20%. Further, a second group 410 (indicated by group number '2') in the illustrated embodiment may have a corresponding second duty cycle range 412 from 20% to less than 30%. Based on the second duty cycle range 412, the second group 410 should include pixels with duty cycles within the second duty cycle range 412 from 20% to less than 30%. The duty cycle ranges 404 may be separate such that the duty cycle ranges 404 do not overlap and pixels are not assigned to two groups.

It should be understood that the duty cycle ranges 404 in the illustrated are shown as an example and that duty cycle ranges 404 may be different in other embodiments. The duty cycle ranges 404 may have a same size or different sizes in embodiments. For example, each of the groups in the illustrated embodiment have a size of 10%. Further, the duty cycle ranges 404 may include all possible duty cycles or a portion of all possible duty cycles in embodiments. For example, the duty cycle ranges 404 include duty cycles ranging from 10% to less than 60% in the illustrated embodiment, which is a portion of all possible duty cycles for pixels. The size of the duty cycle ranges 404 and/or the duty cycles included in the duty cycle ranges 404 may be predetermined, may be based on an indication from a system in which the μLED array is implemented, may be determined by the image processor based on the duty cycles determined from image data received by the image processor, or some combination thereof.

The grouping 400 further indicates pixels included in each group. In particular, the grouping 400 indicates pixels numbers 414 of the pixels included in each of the groups. The pixel numbers 414 may refer to the pixel numbers 308 assigned to the pixels by the pixel numbering approach 300. The pixels may be assigned to the groups based on the duty cycle ranges 404 corresponding to each of the groups. For example, the first group 406 having the first duty cycle range 408 of 10% to less than 20% may include pixels that have been determined to have duty cycles in the range of 10% to less than 20%. In the illustrated embodiment, the first group 406 may include the pixels corresponding to the pixel numbers '1', '2', '3', '18', and '19' based on the pixels having duty cycle in the range of 10% to less than 20%, as can be seen from the pixel numbering approach 300 in FIG. 3, For example, it can be seen that the pixel at the column number of '1' and the row number of '1' has the first duty cycle 202*a* (FIG. 2) of 10% and was assigned the pixel number of '1', Based on the first duty cycle 202*a* of 10% being within the range of 10% to less than 20%, the pixel assigned the pixel number of '1' may be assigned to the first group 406.

An image processor (such as the image processor 116 (FIG. 1)) may generate the groups shown by the grouping 400 and may group the pixels within the groups. For example, the image processor may define the groups and associate the duty cycle ranges 404 with the groups. The image processor may assign the pixels to the different based on the duty cycles of the pixels and the duty cycle ranges 404 corresponding to each of the groups. Further, the image processor may have determined the duty cycles for the pixels based on image data processed by the image processor.

Figure 5:
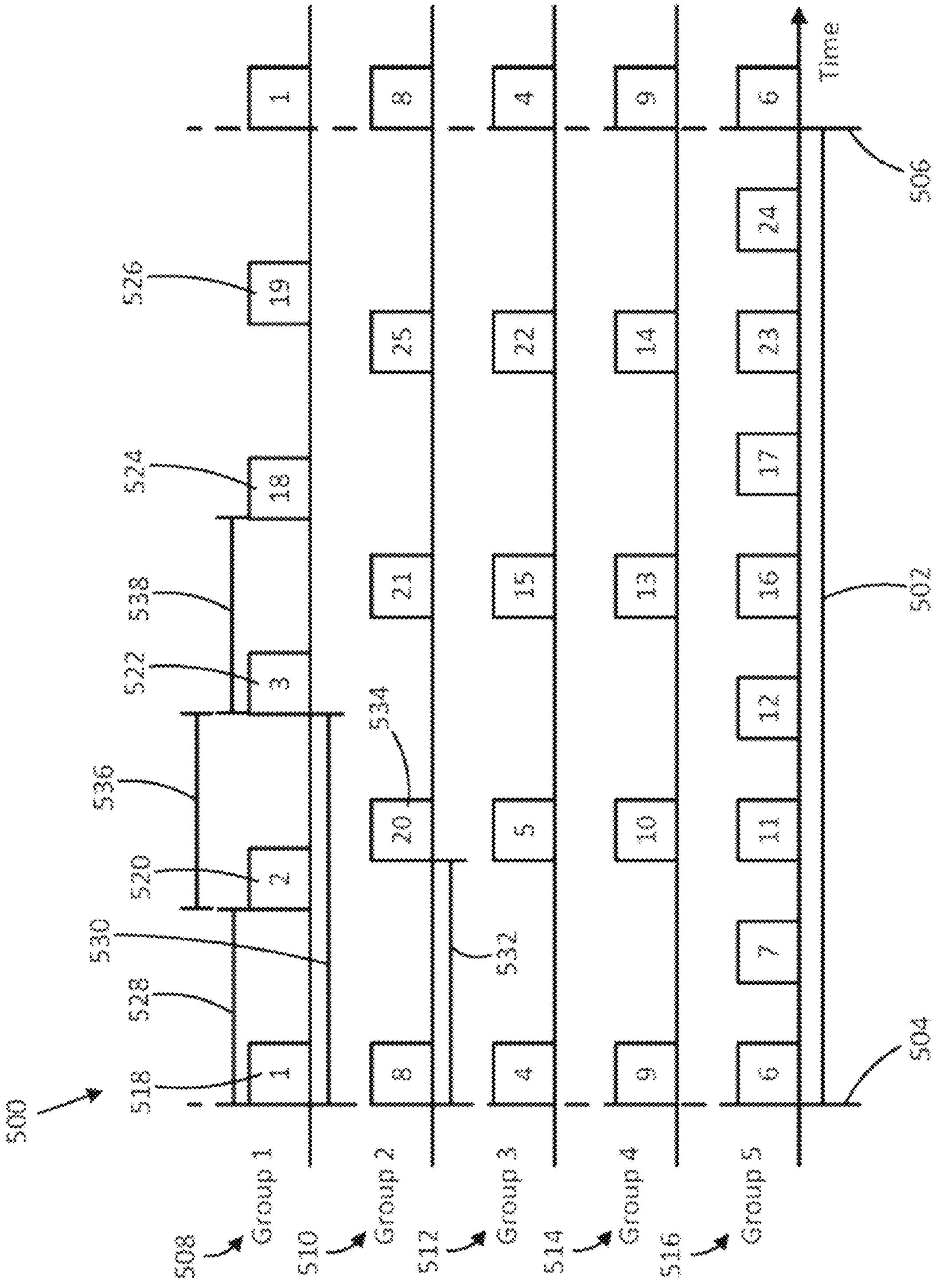
FIG. 5 illustrates an example timing chart for turn on of pixels within an μLED array, according to some embodiments of the present disclosure.

FIG. 5 illustrates an example timing chart 500 for turn on of pixels within an μLED array, according to some embodiments of the present disclosure. In particular, the timing chart 500 may illustrate turn-on times for the pixels indicated in the table 200 (FIG. 2) according to some embodiments of the present disclosure. The example illustrated by the timing chart 500 may by an implementation for a PWM dimming approach to providing current to pixels within an μLED array according to some embodiments of the present disclosure. The leading edge of the steps within the timing chart 500 may indicate a time when the corresponding pixels are turned on. The pixels may stay turned on for the time indicated by the duty cycle corresponding to the pixels.

The timing chart 500 may indicate a cycle 502 for the PWM dimming approach. In the illustrated embodiment, the cycle 502 extends for a period from a first time 504 to a second time 506. The cycle 502 may be utilized for determining when each of the pixels of an array is to be on to produce an image indicated by image data (such as the image data 124 (FIG. 1)) in accordance with the embodiments described herein. For example, the duty cycles of the pixels may indicate a percentage of the cycle 502 that each of the pixels is to be on. Further, turn-on delays that may be determined for each of the pixels may indicate an amount of time after the first time 504 of the cycle 502 that each of the pixels is to be turned on.

The timing chart 500 shows turn-on times for pixels within the five groups produced in accordance with the grouping 400 (FIG. 1). In particular, the timing chart 500 shows five different rows where each row corresponds to a corresponding group. A first group 508 is illustrated by a first row, a second group 510 is illustrated by a second row, a third group 512 is illustrated by a third row, a fourth group 514 is illustrated by a fourth row, and a fifth group 516 is illustrated by a fifth row. Each of the groups correspond to the groups indicated by the grouping 400. In particular, the first group 508 corresponds to the first group 406 (FIG. 4), the second group 510 corresponds to second group 410 (FIG. 4), and so forth. It should be understood that the different groups are shown in different rows for clarity and that the time axis of the timing chart 500 applies to each of the rows. For example, the first time 504 and the second time 506 may be applied at the same position of the time axis as indicated by the corresponding dashed lines in the timing chart.

Each pixel within the μLED array may have an associated turn-on delay, where the turn-on delay may define amount of time after a beginning of a cycle that the pixel is to be turned on. For example, the turn-on delay may define an amount of time that a pixel is to be turned on after the first time 504 of the cycle 502 in the illustrated embodiment. The turn-on delay for each of the pixels within the μLED array may be determined based on the group in which the pixel is assigned, the amount of pixels assigned to the group of which the pixel is included, an order number of the pixel within the group of which the pixel is included, a period of the cycle 502, or some combination thereof. For example, the first group 508 may include five pixels as indicated by the first group 406 of the grouping 400. In particular, the first group 508 may include the pixel labeled with the pixel number of '1', the pixel labeled with the pixel number of '2', the pixel labeled with the pixel number of '3', the pixel labeled with the pixel number of '18', and the pixel labeled with the pixel number of '19'. The pixels may be included in the group based on the duty cycles of the pixels, as described throughout this disclosure. The period of the cycle 502 may be divided by the amount of pixels within a group to determine a delay increment for the group, where the delay increment can be used for determining the turn-on delay of each of the pixels within the group. For example, the period of the cycle 502 may be divided by five to determine the delay increment for the first group 508. The procedure may be repeated for each group to determine delay increments for each group. For example, the delay increment for each group may be determined by the equation td=Tpwm,Np×tot, where td is the delay increment for the group, Tpwm is the period of the cycle 502, and Np×tot is the amount of pixels within the group.

Order numbers of the pixels within a group may be determined based on the pixels within the group and the positions of the pixels within the μLED array. In particular, the order numbers of the pixels within a group may be determined based on the positions of the pixels within the μLED array relative to the position of the other pixels within the group. Further, the order numbers may be determined based on a pixel numbering approach, such as the pixel numbering approach 300 (FIG. 3). The pixel numbers assigned to the pixels in the pixel numbering approach may indicate positions of the pixels within the μLED array. Determining the order numbers for pixels within a group may include ordering the pixels by the corresponding pixel numbers in an ascending order. For example, the pixels within the first group 406 may be ordered in an ascending order to produce the order of the pixel labeled with the pixel number of '1', the pixel labeled with the pixel number '2', the pixel labeled with the pixel number '3', the pixel labeled with the pixel number '18', and the pixel labeled with the pixel number '19'. With the pixels ordered in the ascending order, order numbers may be assigned to the pixels starting with the order number '0' assigned to the first pixel in the ordered pixels of the group and incrementing the order number for next pixel in the ordered pixels of the group. For example, pixel with the pixel number of '1' may be assigned the order number of '0', the pixel with the pixel number of '2' may be assigned the order number of '1', the pixel with the pixel number of '3' may be assigned the order number of '2', the pixel with the pixel number of '18' may be assigned the order number of '3', and the pixel with the pixel number of '19' may be assigned the order number of '4' for the first group 508 in the illustrated embodiment. The procedure may be repeated for each group to assign the pixels in each group with order numbers.

The turn-on delays for each pixel may be determined based on the delay increment for the group in which the pixel is included and the order number assigned to the pixel. In particular, the turn-on delay for a pixel may be determined by multiplying the delay increment by the order number assigned to the pixel. For example, the turn-on delay for the pixel labeled with the pixel number '1' may be determined by multiplying the delay increment for the first group by 0 for the order number, pixel labeled with the pixel number '2' may be determined by multiplying the delay increment for the first group by 1 for the order number, pixel labeled with the pixel number '3' may be determined by multiplying the delay increment for the first group by 2 for the order number, pixel labeled with the pixel number '18' may be determined by multiplying the delay increment for the first group by 3 for the order number, and pixel labeled with the pixel number '19' may be determined by multiplying the delay increment for the first group by 4 for the order number. For example, the turn-on delay for each of the pixels may be determined by the equation tod=td*(Npx−1), where tod is the turn-on delay the pixel, td is the delay increment for the group in which the pixel is included. Npx is the position of the pixel in the ordered pixels of the group in which the pixel is included, and (Npx−1) is the order number. The procedure may be repeated for each pixel to determine the turn-on delays for each of the pixels.

The timing chart 500 illustrates the turn on of the pixels based on the determined turn-on delays for the pixels in accordance with some embodiments. In particular, a leading edge of the steps shown in the timing chart illustrate a turn-on time of the pixel, and the numbers located within the steps indicate the pixel number for the pixel that is being turned on. For example, the first group 508 includes a first step 518 showing the turn-on time for the pixel with the pixel number '1', a second step 520 showing the turn-on time for the pixel with the pixel number '2', a third step 322 showing the turn-on time for the pixel with the pixel number '3', a fourth step 324 showing the turn-on time for the pixel with the pixel number '18', and a fifth step 326 showing the turn-on time for the pixel with the pixel number '19'. The positions of the steps may be determined based on the turn-on delays determined for the pixels. For example, the pixel with the pixel number '1' may be determined to have a turn-on delay of zero and, accordingly, may turn on at the first time 504. The pixel with the pixel number '2' may be determined to have a first turn-on delay 528 and, accordingly, may turn on at the first turn-on delay 528 after the first time 504. Further, the pixel with the pixel number '3' may be determined to have a second turn-on delay 530 and, accordingly, may turn on at the second turn-on delay 530 after the first time 504.

As can be seen from the timing chart 500, the turn-on times for the pixels within different groups may be different based on the delay increments being different. The delay increments may be different due to there being different numbers of pixels included in different groups. For example, a turn-on time for a pixel with the pixel number '20', as illustrated by step 534, may be defined by a turn-on delay 532, where the pixel with the pixel number '20' is the second pixel to be turned on within the second group 510. The turn-on delay 532 for the pixel with the pixel number '20' is longer than the first turn-on delay 528 for the pixel with the pixel number '2', where the pixel with the pixel number '2' is the second pixel to be turned on within the first group 508.

The turn-on times for the pixels within a group may be uniformly distributed within the cycle 50. In particular, the difference between the turn-on time of a pixel within a group and a subsequent turn-on time for the next pixel turned on within the group may be equal for all the pixels within the group. For example, a difference 536 between the turn-on time for the pixel with the pixel number '2' and the turn-on time for the pixel with the pixel number '3' may be equal to the difference 538 between the turn-on time for the pixel with the pixel number '3' and the turn-on time for the pixel with the pixel number '18'. The differences between the turn-on times may be defined based on the delay increment.

While the timing chart 500 illustrates the turn-on times for the pixels, it should be understood that the time that the pixels remain on is defined by the duty cycles for the pixels as shown in the pixel numbering approach 300 of FIG. 3. For example, the pixel with the pixel number '1' may have the first duty cycle 202*a* (FIG. 2) of 10%. After being turned on as shown by the first step 518, the pixel with the pixel number '1' may be maintained on for 10% of the cycle 502. Once the pixel with the pixel number '1' has been on for 10% of the cycle 502, the pixel may be turned off and remain off until the next cycle.

The approach, including the turn-on delays, shown in the timing chart 500 may result in pixels having similar duty cycles having delays between turn-on times and turn-off times, where the pixels having similar duty cycles may be defined as the pixels included in the same group. The delay between the turn-on times and turn-off times may cause the difference in total currents provided by a power supply (such as the power supply 112 (FIG. 1)) to the μLED array during operation to be less than the difference in total currents in legacy PWM dimming approaches for producing a same image. The reduced differences may result in less RMS current, less resistive losses, less EMI, and/or less harmonic noise levels for the approach shown in the timing chart 500 as compared to the legacy PWM dimming approaches. For example, uniformly distributing the turn-on times for each group for the cycle 502 (as implemented by the approach) may cause summed harmonic currents to be canceled out, which may result in the current provided by the power supply to be less peaky and more like a direct current (DC) than legacy PWM dimming approaches.

Figure 6:
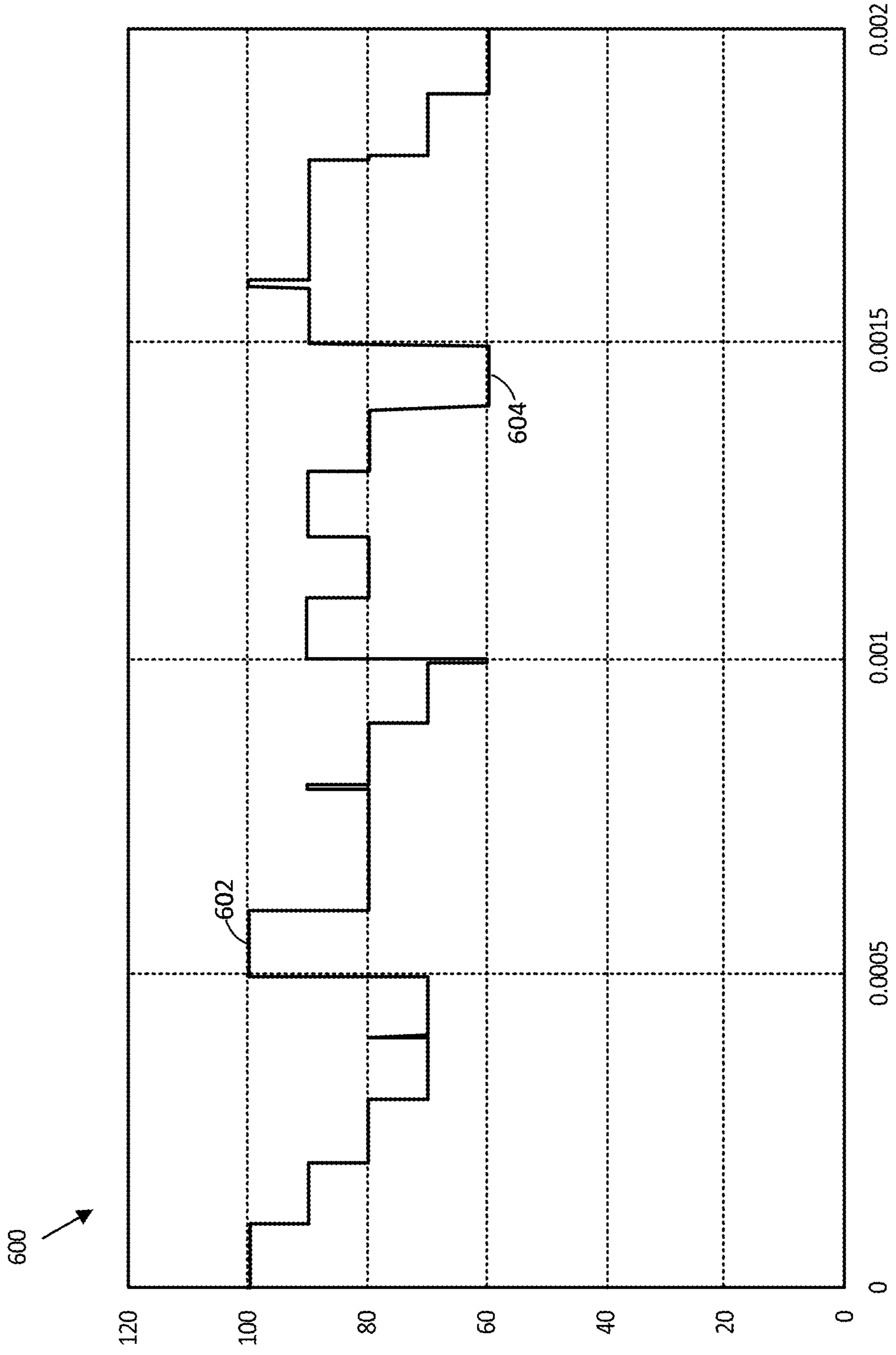
FIG. 6 illustrates an example current diagram for current output by a power supply, according to some embodiments of the present disclosure.

FIG. 6 illustrates an example current diagram 600 for current output by a power supply, according to some embodiments of the present disclosure. In particular, the current diagram 600 may illustrate the current output by a power supply (such as the power supply 112 (FIG. 1)) to an μLED array for a PWM cycle (such as the cycle 502 (FIG. 5)) with the approach described in relation to the timing chart 500 (FIG. 5) applied.

As can be seen from the current diagram 600, the current supplied by the power supply to the μLED array may vary during the cycle. This variance may be due to the pixels being turned on and turned off during the cycle due to differences in turn-on times and turn-off times of the pixels. In the illustrated embodiment, the current may reach a maximum current of 100 milliamps (mA), such as at a first position 602. Further, the current may reach a minimum current of 60 mA, such as at a second position 604. The difference between the maximum current and the minimum current in the illustrated embodiment may be less than a difference between a maximum current and a minimum current that would be produced by a legacy PWM dimming implementation applied to the μLED array when producing the same image as the μLED array did in producing the current diagram 600.

Figure 7:
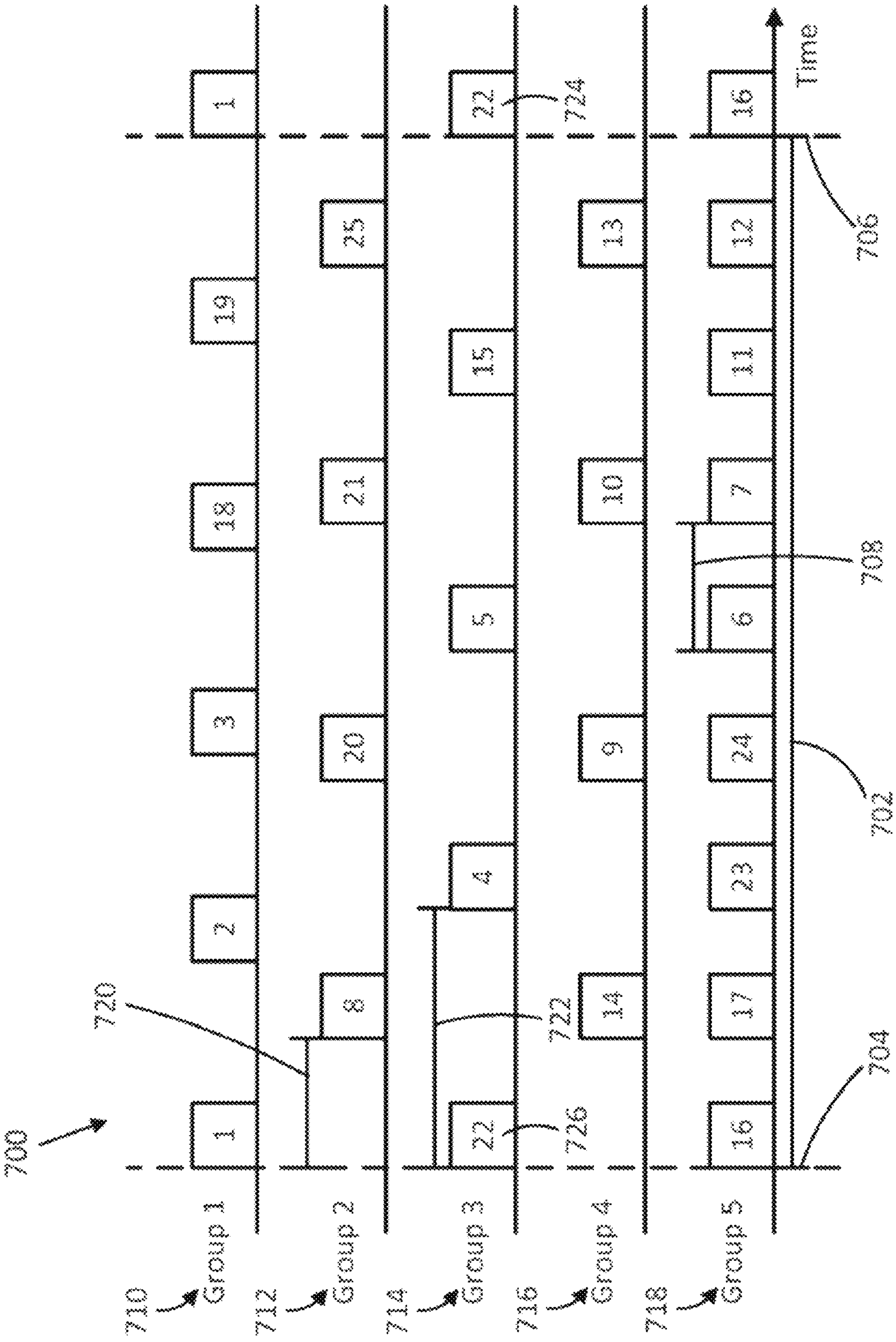
FIG. 7 illustrates another example timing chart for turn on of pixels within an μLED array, according to some embodiments of the present disclosure.

FIG. 7 illustrates another example timing chart 700 for turn on of pixels within an μLED array, according to some embodiments of the present disclosure. In particular, the timing chart 700 may illustrate turn-on timing of pixels for another PWM dimming approach disclosed in this application. In particular, the timing chart 700 may illustrate turn-on times for the pixels indicated in the table 200 (FIG. 2) according to some embodiments of the present disclosure. The example illustrated by the timing chart 700 may by an implementation for a PWM dimming approach to providing current to pixels within an μLED array according to some embodiments of the present disclosure. The leading edge of the steps within the timing chart 700 may indicate a time when the corresponding pixels are turned on. The pixels may stay turned on for the time indicated by the duty cycle corresponding to the pixels.

The timing chart 700 may indicate a cycle 702 for the PWM dimming approach. In the illustrated embodiment, the cycle 702 extends for a period from a first time 704 to a second time 706. The cycle 702 may be utilized for determining when each of the pixels of an μLED array is to be on to produce an image indicated by image data (such as the image data 124 (FIG. 1)) in accordance with the embodiments described herein. For example, the duty cycles of the pixels may indicate a percentage of the cycle 702 that each of the pixels is to be on. Further, turn-on delays that may be determined for each of the pixels may indicate an amount of time after the first time 704 of the cycle 702 that each of the pixels is to be turned on.

The approach shown by the timing chart 700 may include the same procedure for producing the turn-on delays for the pixels described in relation to the timing chart 500 (FIG. 5). The approach shown by the timing chart 700 may further include applying shifts to the pixels in some of the groups to shift turn-on times of the pixels. In particular, shifts for each of the groups may be added to the turn-on times determined as described in relation to the timing chart 500 to produce turn-on times for the approach that produces the timing chart 700.

The shifts for each of the groups may be determined based on the delay increments for the groups. For example, the shifts may be determined based on a smallest delay increment of the groups in some embodiments. In other embodiments, the shifts may be determined based on an average of the delay increments, a largest delay increment of the groups, or another metric produced based on the delay in other embodiments. In some embodiments, the shifts may be predetermined. In the illustrated embodiment, the shifts may be determined based on the smallest delay increment of the groups.

The smallest delay increment may be determined based by comparing the delay increments for the different groups. As can be seen from the timing chart 700, a delay increment 708 (which can be determined based on the difference between adjacent turn-on times for pixels within a group) for a fifth group 718 is the smallest delay increment in the illustrated embodiment. Accordingly, the delay increment 708 may be utilized for determining the shifts for each of the groups.

Each group may have a unique shift. The shift for a group may be determined based on the delay increment 708 and a number of the group. For example, a first group 710 may have a group number of '1', a second group 712 may have a group number of '2', a third group 714 may have a group number of '3', a fourth group 716 may have a group number of '4', and the fifth group 718 may have a group number of '5'. The shift for each group may be determined by multiplying the delay increment 708 by one less than the group number for the group. For example, the shift for the first group 710 may be determined by multiplying the delay increment 708 by 0, thereby having no shift applied to the pixels in the first group. The shift for the second group 712 may be determined by multiplying the delay increment 708 by 1, and so forth for the remaining groups. Accordingly, the shift for a group may be defined by the equation s=td'*(Gx−1), where s is the shift for a group, td' is the delay increment to be utilized for the shift (i.e., the delay increment 708 in the illustrated embodiment), and (ix is the group number. The procedure may be repeated for each to determine the shift for each group.

Updated turn-on delays for each of the pixels may be determined by adding the shift to the turn-on delays determined as described in relation to the timing chart 500. For the illustrated embodiment, the pixels within the first group 710 may have the same turn-on delays as the turn-on delays of the pixels within the first group 508 (FIG. 5) due to the shift for the first group 710 being 0. The pixels within the second group 712 may have a shift 720 for the second group 712 added to the turn-on delays of the pixels within the second group 510 (FIG. 5) to produce updated turn-on delays for the pixels within the second group 712, where the shift 720 is equal to the delay increment 708. The pixels within the third group 714 may have a shift 722 for the third group 714 added to the turn-on delays of the pixels within the third group 512. (FIG. 5) to produce updated turn-on delays for the pixels within the third group 714, where the shift 722 is equal to twice the delay increment 708. The updated turn-on delays for the pixels may be determined by the equation tod'=tod+s, wherein tod' is the updated turn-on delay for pixel, tod is the turn-on delay for the pixel determined as described in relation to the timing chart 500, and s is the shift for the group in which the pixel is included.

In instances where turn-on delays for some pixels within a group are greater than a period of the cycle 702 due to the corresponding shift, the turn-on times of the pixels may occur in a subsequent, adjacent cycle. For example, a pixel with the pixel number '22' may have a turn-on delay defined by tod'=(td*3)+s based on the pixel with the pixel number '22' being assigned an order number of '3', where 'tod' is the updated turn-on delay for the pixel, td is the delay increment for the third group 714, and s is the shift for the third group 714. The pixel number '22' may have been assigned with the order number of '3' based on the positions of the pixels of the third group 714 within the μLED array. The turn-on delay defined by tod' for the pixel with the pixel number '22' may be greater than the period of the cycle 702. The turn-on time for the pixel with the pixel number '22' may occur in a subsequent, adjacent cycle based on the turn-on delay being greater than the period for the cycle. For example, the turn-on time for the pixel with the pixel number '22' may be represented by step 724. Further, a step 726 showing a turn-on time for the pixel with the pixel number '22' may be from a previous set of turn-on times for the third group 714.

Applying the shifts in accordance with the approach described may further cause the difference in total currents provided by a power supply (such as the power supply 112 (FIG. 1)) to the μLED array during operation to be reduced. The reduced differences may result in less RMS current, less resistive losses, less EMI, and/or less harmonic noise levels for the approach shown in the timing chart 700 as compared to the legacy PWM dimming approaches. For example, the approach may cause summed harmonic currents to be canceled out, which may result in the current provided by the power supply to be less peaky and more like a direct current (DC) than legacy PWM dimming approaches.

Figure 8:
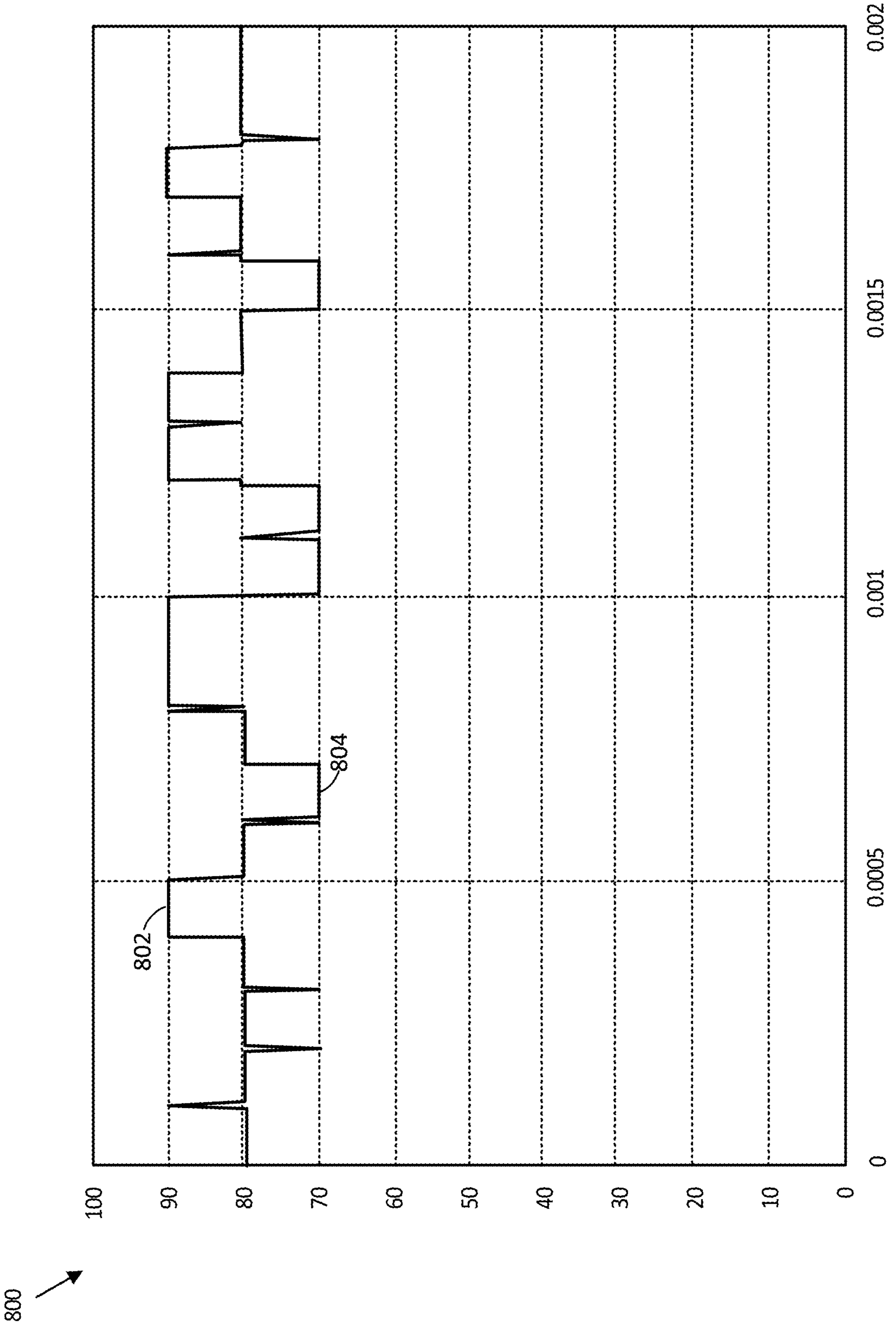
FIG. 8 illustrates an example current diagram for current output by a power supply, according to some embodiments of the present disclosure.

FIG. 8 illustrates an example current diagram 800 for current output by a power supply, according to some embodiments of the present disclosure. In particular, the current diagram 800 may illustrate the current output by a power supply (such as the power supply 112 (FIG. 1)) to an μLED array for a PWM cycle (such as the cycle 702 (FIG. 7)) with the approach described in relation to the timing chart 700 (FIG. 7) applied.

Figure 9:
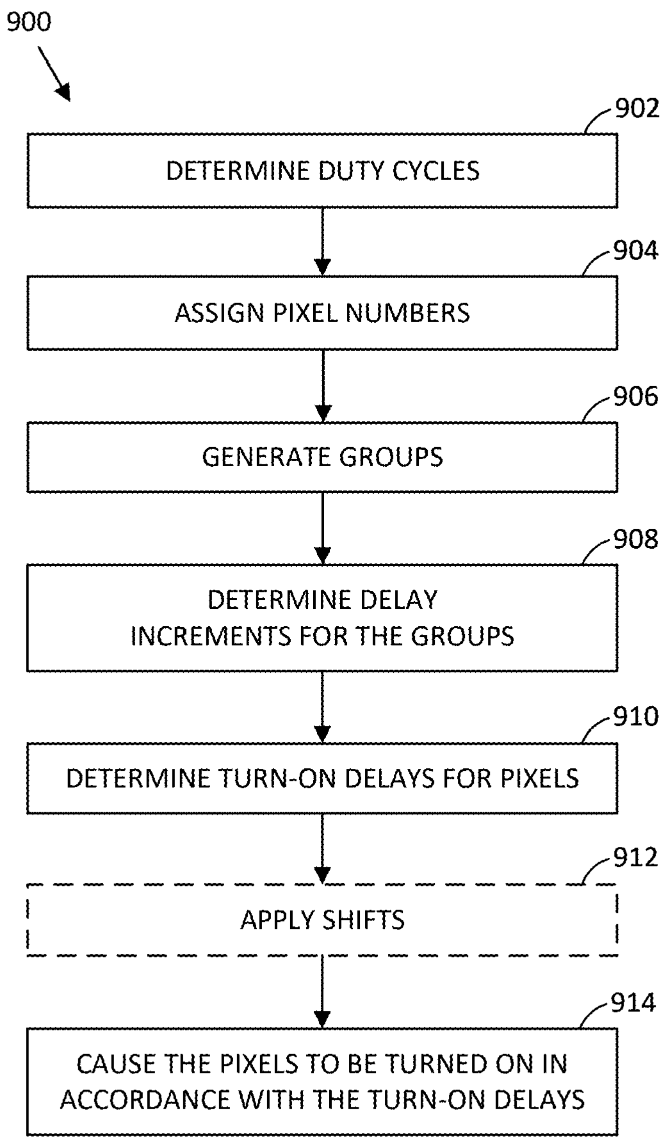
FIG. 9 illustrates an example procedure implementing pulse width modulation dimming, according to some embodiments of the present disclosure.

As can be seen from the current diagram 600, the current supplied by the power supply to the μLED array may vary during the cycle. This variance may be due to the pixels being turned on and turned off during the cycle due to differences in turn-on times and turn-off times of the pixels. In the illustrated embodiment, the current may reach a maximum current of 90 mA, such as at a first position 802. Further, the current may reach a minimum current of 70 mA, such as at a second position 804. The difference between the maximum current and the minimum current in the illustrated embodiment may be less than a difference between a maximum current and a minimum current that would be produced by a legacy PWM dimming implementation applied to the μLED array when producing the same image as the μLED array did in producing the current diagram 800. FIG. 9 illustrates an example procedure 900 implementing PWM dimming, according to some embodiments of the present disclosure. In particular, the procedure 900 may implement the approach described in relation to the timing chart 500 (FIG. 5) or the timing chart 700 (FIG. 7). The procedure 900 may be performed by control (such as the control 114 (FIG. 1)) to perform PWM dimming for an μLED array (such as the μLED array 102 (FIG. 1)). For example, an image processor (such as the image processor 116 (FIG. 1)) of the control may perform the procedure 900 and a digital interface (such as the digital interface 118 (FIG. 1)) of the control may facilitate communication of the control with other elements, such as the μLED array.

In stage 902, the control may determine duty cycles for pixels within the μLED array. In particular, the control may determine duty cycles for the pixels based on an image to be produced by the μLED array, where the image may be determined based on image data (such as image data 124 (FIG. 1)) received by the control.

In stage 904, the control may assign pixel numbers to the pixels. For example, the control may assign the pixels with pixel numbers in accordance with the pixel numbering approach 300 (FIG. 3).

In stage 906, the control may generate groups for the pixels. In particular, the control may generate two or more groups and determine duty cycle ranges for each of the groups. The control may assign pixels to the groups based on the duty cycles of the pixels and the duty cycle ranges corresponding to the groups. For example, the control may generate the groups in accordance with the generation of groups described in relation to the grouping 400 (FIG. 4).

In stage 908, the control may determine delay increments for the groups. In particular, the control may determine a period of a cycle to be utilized for the PWM dimming. Further, the control may determine the amount of pixels in each of the groups. The control may divide the period of the cycle by the amount of pixels in each of the groups. For example, the control may generate the delay increments for the groups as described for determining delay increments in relation to the timing chart 500 (FIG. 5).

In stage 910, the control may determine turn-on delays for each of the pixels. In particular, the control may determine the turn-on delays for each of the pixels based on the delay increments for the groups and order numbers of the pixels. The control may multiply the delay increments by the order numbers of the pixels to determine the turn-on delays for each of the pixels. For example, the control may determine the turn-on delays for each of the pixels as described for determining the turn-on delays in relation to the timing chart 500 (FIG. 5).

In stage 912, the control may apply shifts to the turn-on delays to produce updated turn-on delays. In particular, the control may determine shifts for each of the groups of the pixels. In some embodiments, the shifts may be determined based on the delay increments of the groups. The control may add the shifts for the groups to the turn-on delays to produce the updated turn-on delays for the pixels. For example, the control may apply the shift in accordance with the application of shifts described in relation to the timing chart 700 (FIG. 7). In some embodiments, stage 912 may be omitted, such as in embodiments implementing the approach without shifts.

In stage 914, the control may cause the pixels to be turned on in accordance with the turn-on delays determined in stage 910 or stage 912. In particular, the control may provide one or more indications of PWM duty cycles and/or amplitude (such as the indication 126 (FIG. 1)) to the μLED array. The indications may cause PWM switches (such as the PWM switch 108 (FIG. 1)) corresponding to each of the pixels to turn on in accordance with the turn-on delays determined in stage 910 or stage 912. The indications may further cause the PWM switches corresponding to each of the pixels to turn off in accordance with duty cycles of the pixels.

Figure 10:
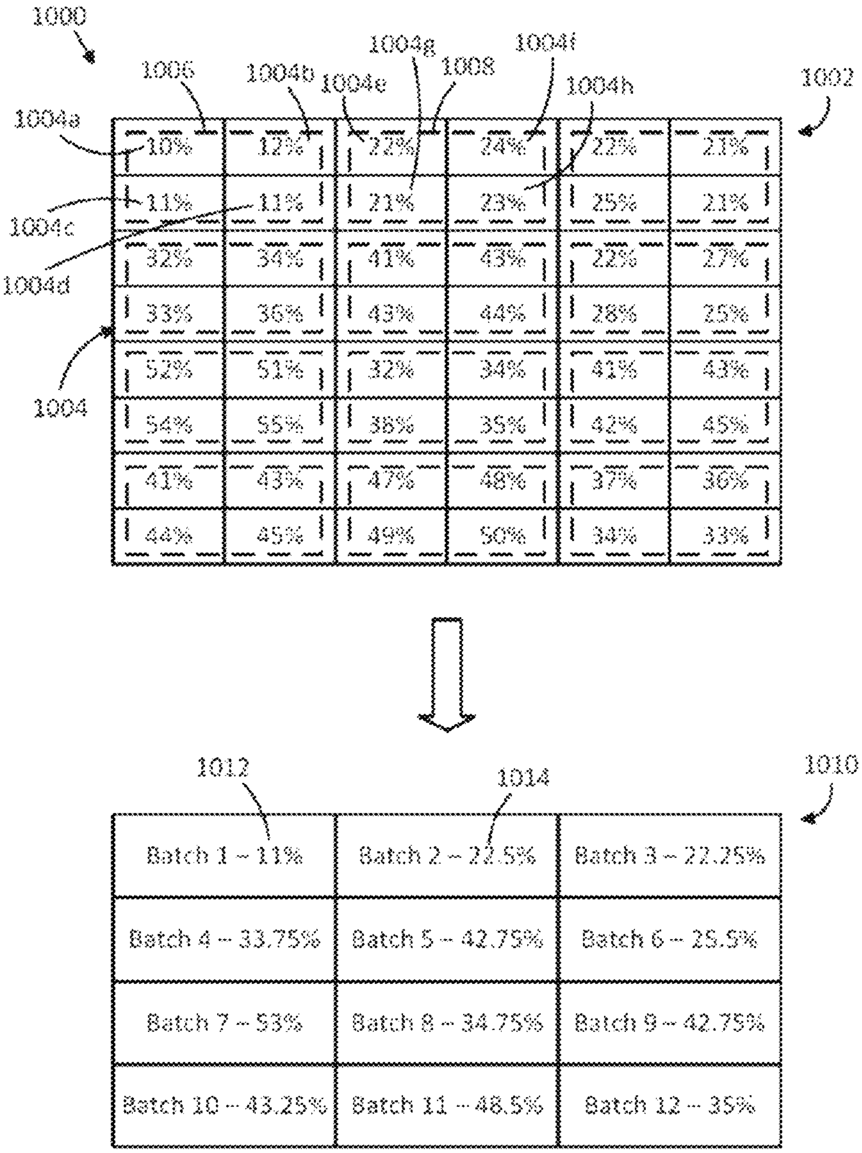
FIG. 10 illustrates an example pixel batching approach, according to some embodiments of the present disclosure.

FIG. 10 illustrates an example pixel batching approach 1000, according to some embodiments of the present disclosure. For example, the pixel batching approach 1000 may include batching pixels within an μLED array into plurality of batches based on the positions of the pixels within the μLED array. The batches produced by the pixel batching approach 1000 may be utilized in the procedure 900 (FIG. 9) in place of the pixel for determining turn-on times for the batches. In particular, the batches may be grouped based on duty cycles of the batches and the batches may be turned on in accordance with turn-on delays determined for each of the batches, where each of the pixels within a batch is turned on and turned off in accordance with the turn-on delay and the duty cycle of the batch.

Table 1002 may indicate duty cycles 1004 for an μLED array, such as the μLED array 102 (FIG. 1). The duty cycles 1004 may be determined by an image processor (such as the image processor 116 (FIG. 1)) based on image data (such as the image data 124 (FIG. 1)), The table 1002 may indicate an arrangement, or a representation of an arrangement, of pixels within an μLED array. For example, the table 1002 indicates that the μLED array of the illustrated embodiment may be arranged in, or can be represented by, six columns and eight rows. In particular, the μLED array may comprise 48 pixels in the illustrated embodiment, where the pixels may be arranged in six columns and eight rows. While μLED arrays may include thousands or millions of pixels in most instances and can be arranged in different arrangements, 48 pixels are illustrated in the illustrated embodiment to provide understanding of the subject matter described herein.

The table 1002 may indicate duty cycles 1004 for the pixels based on the pixels based on the positions of the pixels within the μLED array. For example, a first duty cycle 1004*a* of '10%' may indicate that a pixel located at the first column and the first row of the μLED array should have a duty cycle of 10%. A second duty cycle 1004*b* of '12%' may indicate that a pixel located at the second column and the first row of the μLED array should have a duty cycle of 12%. A duty cycle may be provided for each of the pixels within the μLED array in the table 200.

The pixels indicated by the table 1002 may be batched based on positions of the pixels within the μLED array. For example, pixels indicated by the table 1002 may be batched into multiple batches based on the positions of the pixels, where each batch includes a plurality of pixels. The pixels to be included in a batch may be defined by a number of columns and a number of rows to be included in the batch in some embodiments. For example, a batch may be defined as including two columns and two rows in the illustrated embodiment, where the pixels within the defined area may be included in the batch. In the illustrated embodiment, a first batch 1006 may be defined to include pixels within the defined area of the first two columns and the first two rows. Accordingly, the first batch 1006 (indicated by the dashed box) may include the pixel corresponding to the first duty cycle 1004*a*, the pixel corresponding to the second duty cycle 1004*b*, a pixel corresponding to a third duty cycle 1004*c* (located at the first column and the second row of the table 1002), and a pixel corresponding to a fourth duty cycle 1004*d* (located at the second column and the second row of the table 1002). A second batch 1008 may be defined to include pixels within the defined area of the second two columns and the first two rows in the illustrated embodiment. Accordingly, the second batch 1008 (indicated by the dashed box) may include a pixel corresponding to a fifth duty cycle 1004*e* (located at the third column and the first row of the table 1002), a pixel corresponding to a sixth duty cycle 1004*f* (located at the fourth column and the first row of the table 1002), a pixel corresponding to a seventh duty cycle 1004*g* (located at the third column and the second row of the table 1002), and a pixel corresponding to an eighth duty cycle 1004*h* (located at the fourth column and the second row of the table 1002). The rest of the pixels within the μLED array as indicated by the table 1002 may be batched accordingly in the illustrated embodiment, such that each batch may include an area defined by two corresponding columns and two corresponding rows. While the batches in the illustrated embodiment are shown as including pixels within an area defined by two columns and two rows, it is to be understood that the defined areas of the batches may be defined by different numbers of columns and/or rows in other embodiments, or may be defined by other arrangement relationships in other embodiments. Further, the area defined for each of the batches may be determined based on a computing power of a device (such as the image processor 116 (FIG. 1)) performing the procedure 900 and/or a number of pixels within the μLED array.

Table 1010 may show duty cycles corresponding to each of the batches produced by the pixel batching approach 1000. Each of the batches may have duty cycles based on the duty cycles of the pixels included within the batch. A duty cycle for a batch may be determined by averaging the duty cycles of the pixels included within the batch. For example, a first batch duty cycle 1012 for the first batch 1006 may be produced by determining an average of the first duty cycle 1004*a*, the second duty cycle 1004*b*, the third duty cycle 1004*c*, and the fourth duty-cycle 1004*d* that correspond to pixels within the first batch 1006. In particular, the average of the first duty cycle 1004*a* of '10%', the second duty cycle 1004*b* of '12%', the third duty cycle 1004*c* of '11%', and the fourth duty cycle 1004*d* of '11%' may comprise the first batch duty cycle 1012 of '11%' for the first batch 1006. Further, a second batch duty cycle 1014 for the second batch 1008 may be produced by determining an average of the fifth duty cycle 1004*e*, the sixth duty cycle 1004*f*, the seventh duty cycle 1004*g*, and the eighth duty cycle 1004*h*. In particular, the average of the fifth duty cycle 10040 of '22', the sixth duty cycle 1004*f* of '24%', the seventh duty cycle 1004*g* of '21%', and the eighth duty cycle 1004*h* of '23' may comprise the second batch duty cycle 1014 of '22.5%'. Determining the batch duty cycles may be performed for the rest of the batches produced by the pixel hatching approach 1000 accordingly. While the batch duty cycles are shown including decimal points in the illustrated embodiment, it should be understood that the batch duty cycles may be rounded to whole numbers in other embodiments.

The procedure 900 may be utilized for determining the turn-on times for each of the batches, where the batches may take the place of the pixels in the procedure 900. For example, multiple batches may be grouped together based on the duty cycles of the batches. The batches within each of the groups may receive order numbers that indicate the order of the batches within the group. Further, the delay increment for each of the groups may be determined based on the amount of batches within the group. The turn-on time for each of the batches may be determined based on the delay increment for the corresponding order number for the batch. In some embodiments, shifts may be applied to the turn-on times based on the batch numbers to produce updated turn-on delays and turn-on times.

Each of the pixels may be turned on in accordance with the turn-on delays of the corresponding batches in which each of the pixels are located. For example, the pixels corresponding to the first duty cycle 1004*a*, the second duty cycle 1004*b*, the third duty cycle 1004*c*, and the fourth duty cycle 1004*d* that are included in the first batch 1006 may be turned on in accordance with a turn-on delay determined for the first batch 1006 based on the procedure 900. Each of the pixels may be maintained in an on state for the corresponding batch duty cycle or the corresponding duty for the pixel.

Figure 11:
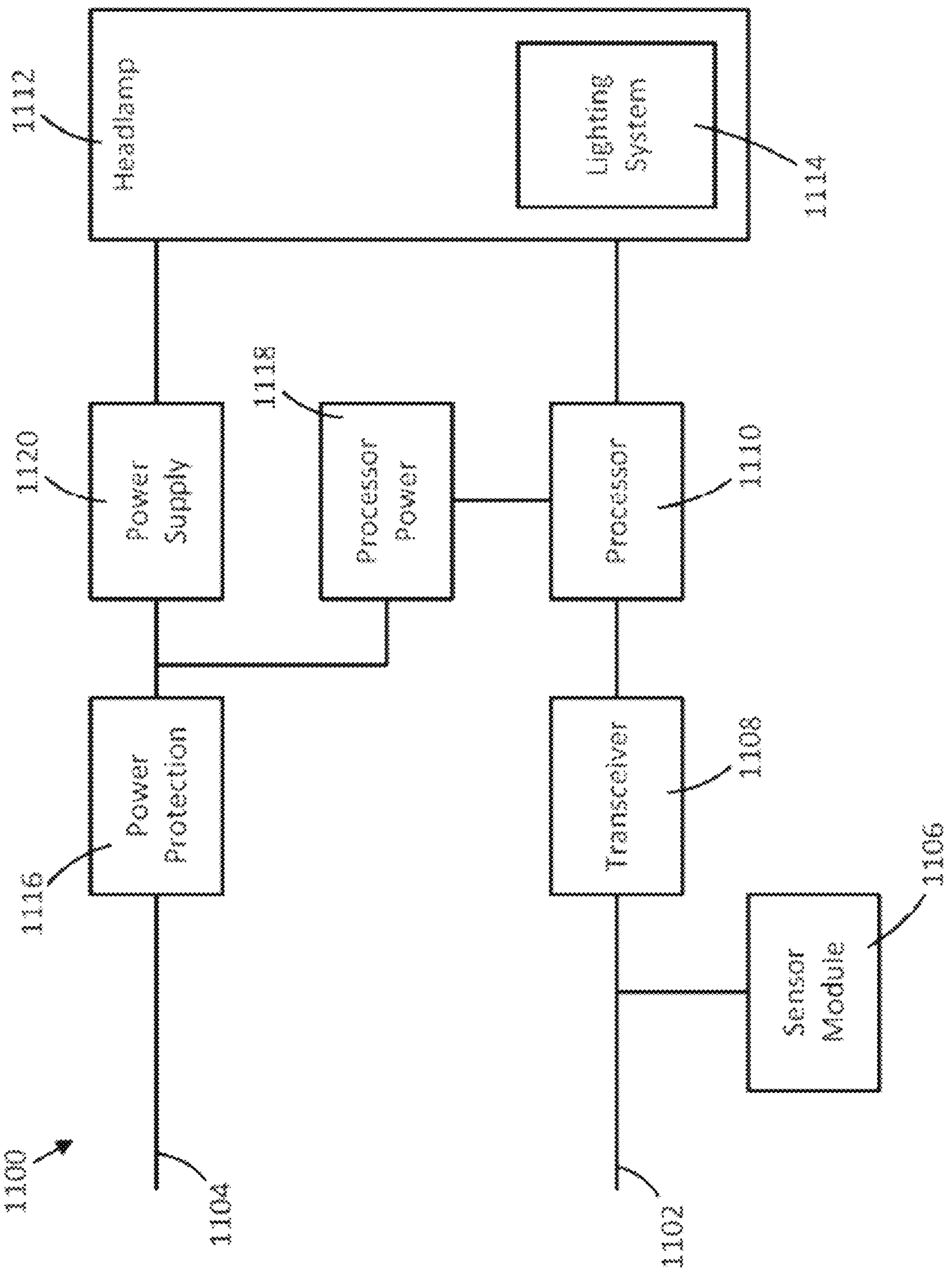
FIG. 11 illustrates an example system, according to some embodiments of the present disclosure.

FIG. 11 illustrates an example system 1100, according to some embodiments of the present disclosure. In some embodiments, the system 1100 may comprise a portion of a vehicle headlamp system in some embodiments. For example, the system 1100 may comprise an active headlamp system in some embodiments, where an intensity of light and/or image of the light output by the system 1100 may be changed. The system 1100, or portions thereof, may reside in a vehicle, in a headlamp of a vehicle, or some combination thereof. The system 1100 may implement a pixelated configuration made possible by an array of LEDs.

The system 1100 may be coupled to a bus 1102 of the vehicle and a power source 1104. The power source 1104 may provide power for the system 1100. The bus 1102 may be coupled to one or more components that can provide data and/or utilize data provided to the system 1100. The data provided on the bus 1102 may be related to environment conditions around the vehicle (such as a time of day, whether there is rain, whether there is fog, ambient light levels, and other environmental data), conditions of the vehicle (such as whether the vehicle is parked, whether the vehicle is in-motion, a current speed of the vehicle, a current direction of travel of the vehicle), and/or presence/positions of oilier vehicles or pedestrians around the vehicle. The system 1100 may provide feedback (such as information regarding operation of the system) to the components.

The system 1100 may further comprise a sensor module 1106. In some embodiments, the sensor module 1106 may include one or more sensors that can sense surroundings of the vehicle. For example, the one or more sensors may sense surroundings that can affect an image to be produced by light emitted by the system 1100. In some embodiments, the sensors may sense environmental conditions around the vehicle, and/or presence/positions of other vehicles or pedestrians around the vehicle. The sensor module 1106 may operate in combination with the data provided on the bus 1102 or may operate in lieu of a portion of the data (such as the environment conditions, and/or the presence/positions of the other vehicles or pedestrians) being provided on the bus 1102. The sensor module 1106 may output data indicating what has been sensed by the sensors.

The system 1100 may further include a transceiver 1108. The transceiver 1108 may have a universal asynchronous receiver-transmitter (UART) interface or a serial peripheral interface (SN) in some embodiments. The transceiver 1108 may be coupled to the bus 1102 and the sensor module 1106, and may receive data from the bus 1102 and the sensor module 1106. In some embodiments, the transceiver 1108 may multiplex the data received from the bus 1102 and the sensor module 1106, and may direct feedback to the bus 1102 or the sensor module 1106.

The system 1100 may further include a processor 1110. The processor 1110 may be coupled to the transceiver 1108 and exchange data with the transceiver 1108. For example, the processor 1110 may receive data from the transceiver 1108 that was provided by the bus 1102 and/or the sensor module 1106. The processor 1110 may generate image data that indicates an image to be produced by light emitted from the system 1100. The image data may include one or more of the features of the image data 124 (FIG. 1), The processor 1110 may further generate one or more inquiries that request information from one or more of the components of the system. The inquiries may include one or more of the features of the inquiry 120 (FIG. 1). The processor 1110 may further provide the feedback to the transceiver 1108 to be directed to the bus 1102 or the sensor module 1106.

The system 1100 may further include a headlamp 1112 of the vehicle. The headlamp 1112 may comprise an active headlamp in some embodiments, where the active headlamp may produce multiple different outputs of light. The headlamp 1112 may include a lighting system 1114. The lighting system 1114 may include one or more of the features of the lighting system 100 (FIG. 1). The headlamp 1112 may be coupled to the processor 1110 and may exchange data with the processor 1110. In particular, the lighting system 1114 may be coupled to the processor 1110 and may exchange data with the processor 1110. The lighting system 1114 may receive the image data and inquiries from processor 1110 and may provide feedback to the processor 1110.

The system 1100 may further include power protection 1116. The power protection 1116 may be coupled to the power source 1104 and may receive power from the power source. The power protection 1116 may include one or more filters that may reduce conducted emissions and provide power immunity. In some embodiments, the power protection 1116 may provide electrostatic discharge (ESD) protection, load-dump protection, alternator field decay protection, reverse polarity protection, or some combination thereof.

The system 1100 may further include processor power 1118. The processor power 1118 may be coupled to the power protection 1116 and may receive power from the power source 1104. The processor power 1118 may comprise a low-dropout (LDO) regulator that may generate a power for powering the processor 1110 from the power provided by the power source 1116. The processor power 1118 may further be coupled to the processor 1110 and may provide power to the processor 1110.

The system 1100 may further comprise a power supply 1120. The power supply 1120 may be coupled to the power protection 1116 and may receive power from the power source 1104. In some embodiments, the power supply 1120 may comprise a converter that converts the power from the power source 1104 to power for the headlamp 1112. For example, the power supply 1120 may comprise a direct current (DC)-to-DC converter that converts the power from the power supply 1120 from a first voltage to a second voltage for the lighting system 1114 of the headlamp 1112.

Figure 12:
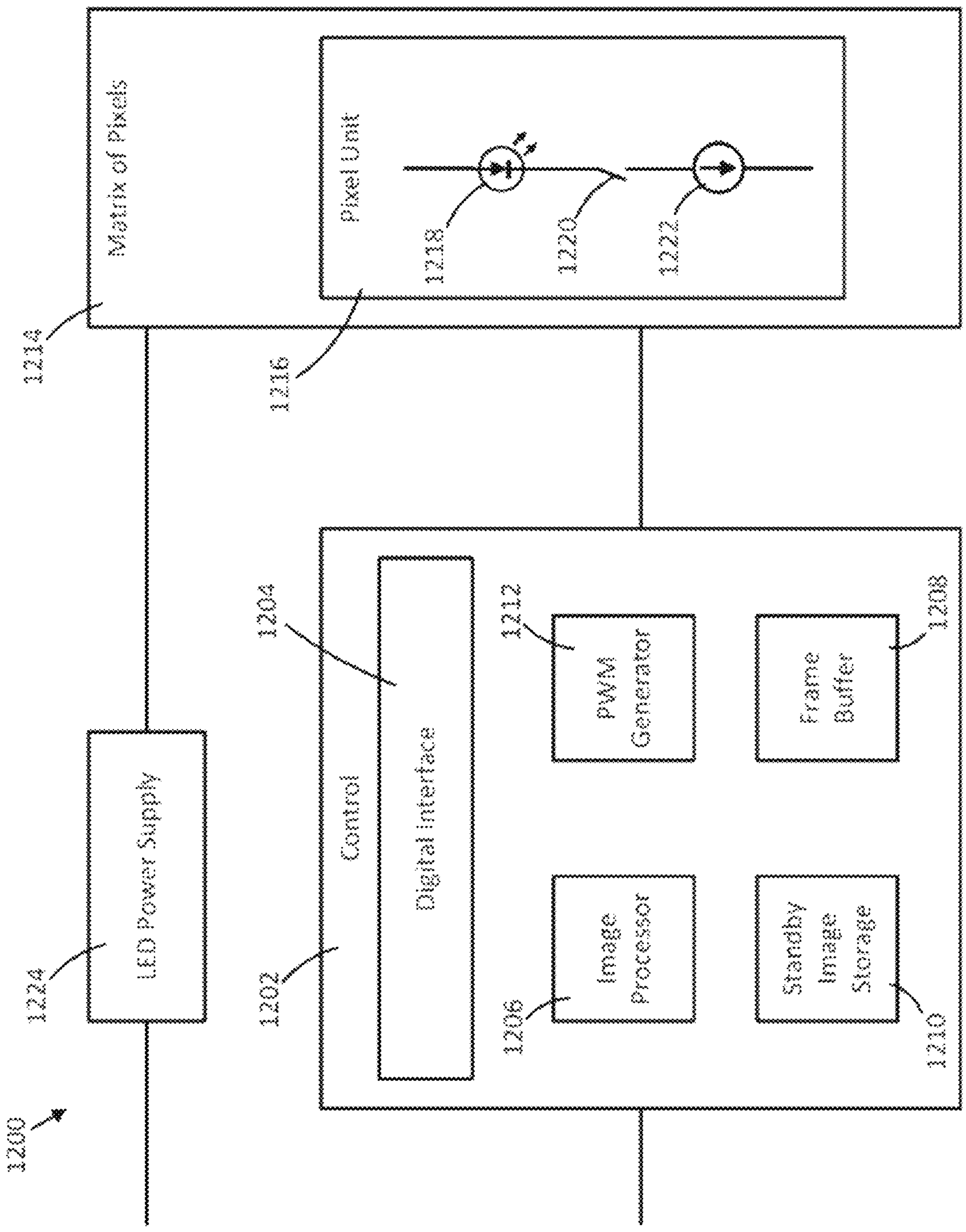
FIG. 12 illustrates an example lighting system, according to some embodiments of the present disclosure.

FIG. 12 illustrates an example lighting system 1200, according to some embodiments of the present disclosure. For example, the lighting system 1100 (FIG. 11) may include one or more of the features of the lighting system 1200. The lighting system 1200 may be implemented in a headlamp, such as the headlamp 1112 (FIG. 11).

The lighting system 1200 may include a control module 1202. The control module 1202 may include one or more of the features of the control 114 (FIG. 1). The control module 1202 may be coupled to a processor of system (such as the processor 1110 (FIG. 11)). The control module 1202 may receive image data and inquiries from the processor. The control module 1202 may further provide feedback to the processor.

The control module 1202 may include a digital interface 1204. The digital interface 1204 may facilitate communication with the processor and other components within the lighting system 1200. For example, the digital interface 1204 may comprise an SPI interface in some embodiments, where the SPI interface may facilitate communication.

The control module 1202 may further include an image processor 1206. The image processor 1206 may include one or more features of the image processor 116 (FIG. 1). The image processor 1206 may receive the image data via the digital interface 1204 and may process the image data to produce indications of PWM duty cycles and/or intensities of light for causing the light system 1200 to produce the images indicated by the image data. The image processor 1206 may further determine turn-on times in accordance with the approaches described herein and provide indications of the turn-on times. For example, the image processor 1206 may perform the procedure 900 (FIG. 9) for determining turn-on times and generate the indications of the turn-on times accordingly.

The control module 1202 may further include a frame buffer 1208 and a standby image storage 1210. The frame buffer 1208 may receive the indications produced by the image processor 1206 and store the indications for implementation. The standby image storage 1210 may further store indications of PWM duty cycles, intensities of light, and/or turn-on times. The indications stored in the standby image storage 1210 may be implemented in the absence of indications stored in the frame buffer 1208. For example, the frame buffer 1208 may retrieve the indications from the standby image storage 1210 when the frame buffer 1208 is empty.

The control module 1202 may further include a PWM generator 1212, The PWM generator 1212 may receive the indications from the frame buffer 1208 and may produce PWM signals in accordance with the indications. The PWM generator 1212 may further determine intensities of light based on the indications and produce a signal to cause the intensities of light to be produced.

The lighting system 1200 may include a μLED array 1214. The μLED array 1214 may include a plurality of pixels, where each of the pixels include a pixel unit 1216. The μLED array 1214 may include one or more of the features of the μLED array 102 (FIG. 1). Further, the pixel unit 1216 may include one or more of the features of the pixel unit 104 (FIG. 1). In particular, the pixel unit 1216 may include an LED 1218, a PWM switch 1220, and a current source 1222. The LED 1218, the PWM switch 1220, and the current source 1222 may include one or more of the features of the LED 106 (FIG. 1), the PWM switch 108 (FIG. 1), and the current source 110 (FIG. 1), respectively. The pixel unit 1216 may receive the signals from the PWM generator 1212. The PWM signal from the PWM generator 1212 may cause the PWM switch 1220 to open and close in accordance with the value of the PWM signal. The signal corresponding to the intensities of light may cause the current source 1222 produce a current flow to cause the LED 1218 to produce the corresponding intensities of light.

The lighting system 1200 may further include an LED power supply 1224. The LED power supply 1224 may be coupled to the power supply 1120 (FIG. 11) and may receive power from the power supply 1120. The LED power supply 1224 may produce power for the LEDs of the μLED array 1214. The LED power supply 1224 may be coupled to the μLED array 1214 and may provide the power for the LEDs to the μLED array 1214.

Figure 13:
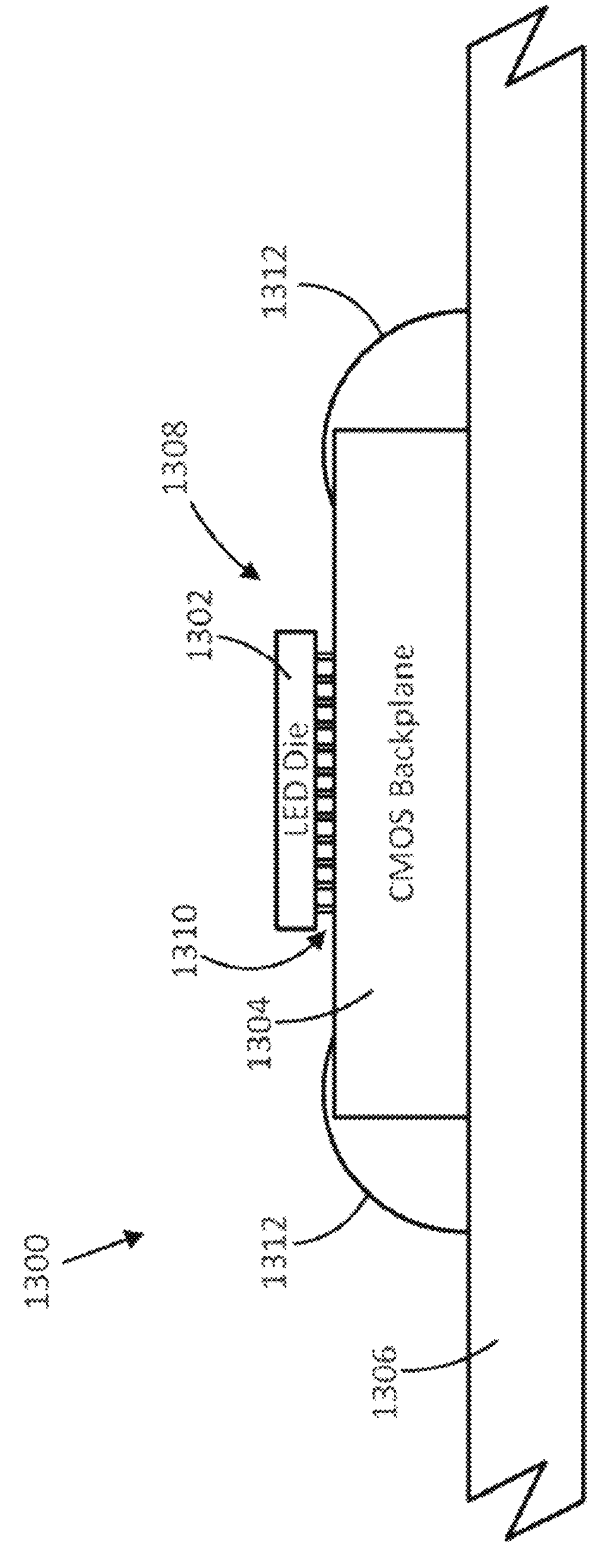
FIG. 13 illustrates an example hardware arrangement for implementing the system of FIG. 11, according to some embodiments of the present disclosure.

FIG. 13 illustrates an example hardware arrangement 1300 for implementing the system 1100 of FIG. 11, according to some embodiments of the present disclosure. In particular, the hardware arrangement 1300 may illustrate hardware components that may implement the system 1100.

The hardware arrangement 1300 may include an integrated LED 1308. The integrated LED 1308 may include an LED die 1302 and a complementary metal oxide semiconductor (CMOS) backplane 1304. The LED die 1302 may be coupled to the CMOS backplane 1304 by one or more interconnects 1310, where the interconnects 1310 may provide for transmission of signals between the LED die 1302 and the CMOS backplane 1304, The interconnects 1310 may comprise one or more solder bump joints, one or more copper pillar bump joints, or some combination thereof.

The LED die 1302 may include circuitry to implement the μLED array 1214 (FIG. 12). In particular, the LED die 1302 may include a plurality of pixels of the μLED array 1214. The LED die 1302 may include a shared active layer and a shared substrate for the μLED array 1214, thereby having the μLED array 1214 be a monolithic μLED array. Each pixel of the μLED array 1214 may include an individual segmented active layer and/or substrate. Accordingly, the LED die 1302 may be a monolithic die that has a segmented surface with a corresponding pixel of the μLED array 1214 occupying each segment of the surface. The LED die 1302. In some embodiments, the LED die 1302 may further include the PWM switches and the current sources of the μLED array 1214. In other embodiments, the PWM switches and the current sources may be included in the CMOS backplane 1304.

The CMOS backplane 1304 may include circuitry to implement the local control module 1202 (FIG. 12) and the LED power supply 1224 (FIG. 12). The CMOS backplane 1304 may utilize the interconnects 1310 to provide the μLED array 1214 with the PWM signals and the signals for the intensity for causing the μLED array 1214 to produce light in accordance with the PWM signals and the intensity. Because of the relatively large number and density of connections to drive the μLED array compared to standard LED arrays, different embodiments may be used to electrically connect the CMOS backplane 1304 and the LED die 1302. Either the bonding pad pitch of the CMOS backplane 1304 may be the same as the pitch of bonding pads in the PLED array, or the bonding pad pitch of the CMOS backplane 1304 may be larger than the pitch of bonding pads in the μLED array 1214.

The hardware arrangement 1300 may further include a board 1306. The board 1306 may include circuitry to implement the power protection 1116 (FIG. 11), the power supply 1120 (FIG. 11), the processor power 1118 (FIG. 11), the sensor module 1106 (FIG. 11), the transceiver 1108 (FIG. 11), the processor 1110 (FIG. 11), or portions thereof. The board 1306 may be coupled to the CMOS backplane 1304. For example, the board 1306 may be coupled to the CMOS backplane 1304 via one or more wirebonds 1312 in the illustrated embodiment. The board 1306 and the CMOS backplane 1304 may exchange image data, power, and/or feedback via the coupling, among other signals.

Figure 14:
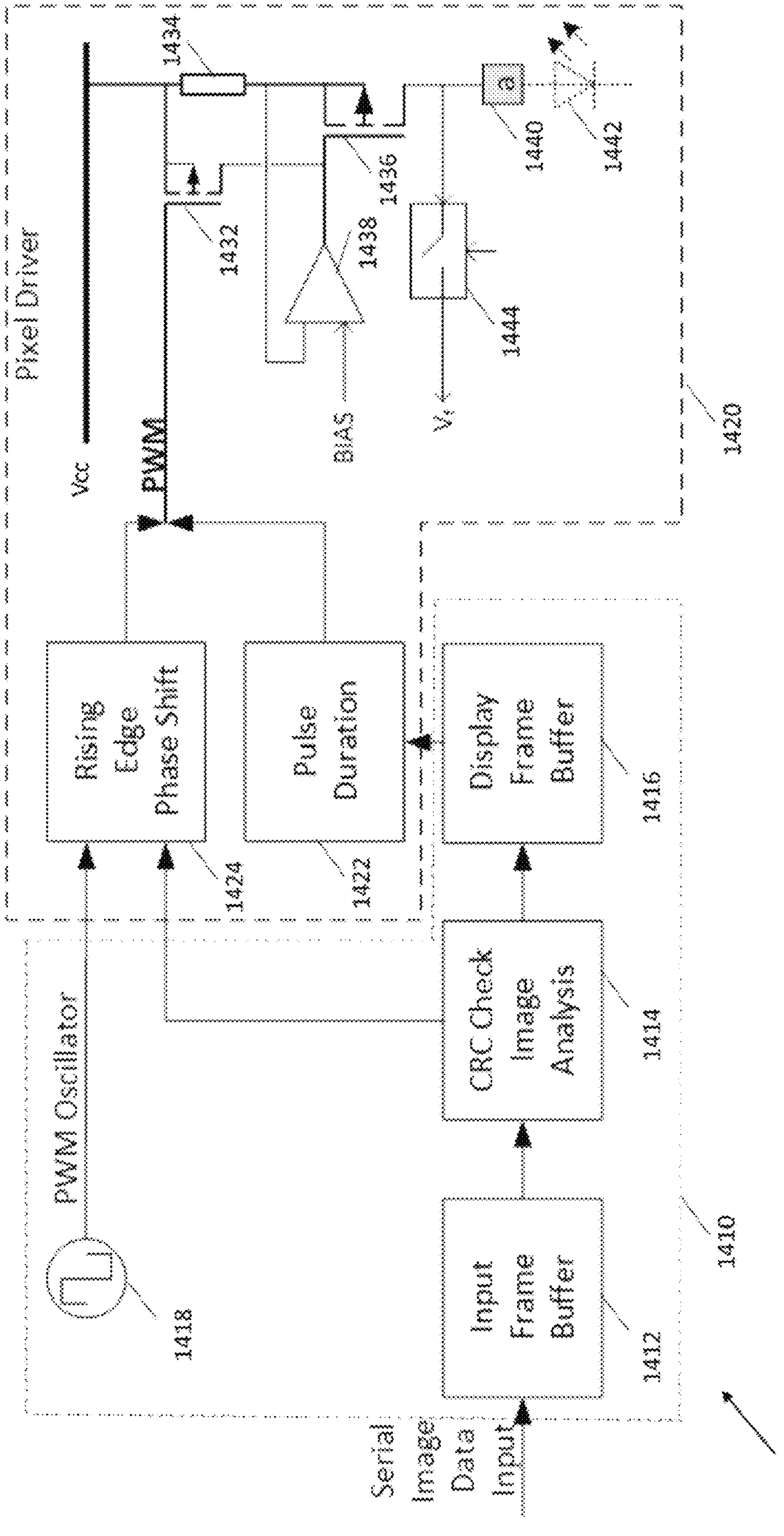
FIG. 14 illustrates an example hardware arrangement for implementing the system, according to some embodiments of the present disclosure.

FIG. 14 illustrates an example hardware arrangement for implementing the system, according to some embodiments of the present disclosure. FIG. 14 shows an example arrangement as described in relation to FIGS. 1 and 12. In particular, FIG. 14 shows further specifics of the control 1410 and the pixel matrix 1420 of the system 1400 as described in more detail above. Note that not all elements may be shown, such as the processor and memories used to provide the functionality of the various modules shown in FIG. 14. In some embodiments, the circuitry shown in FIG. 14 may be provided on the CMOS backplane.

The control 1410 may be supplied with data to control the LEDs 1442. In particular, the control 1410 contains an input frame buffer 1412 having an input to which serial image data to be provided for display may be received via the digital interface. The serial image data may include the indications produced by the image processor (not shown). As above, the input frame buffer 1412 may retrieve the indications from the standby image storage (shown in FIG. 12) when the input frame buffer 1412 is empty. The input frame buffer 1412 may provide the serial image data to a cyclic redundancy check (CRC) image analysis module 1414 of the processor which may determine whether the serial image data buffered is valid. If so, the valid data may be supplied to a display frame buffer 1416.

Data from the CRC image analysis module 1414 and the display frame buffer 1416 may be supplied to the pixel driver 1420 to drive the LEDs 1442. In particular, the data from the CRC image analysis module 1414 may be supplied to a rising edge phase shift module 1424 of the pixel driver 1420 while data from the display frame buffer 1416 may be supplied to a pulse duration module 1422 of the pixel driver 1420. The rising edge phase shift module 1424 may also receive a PWM of a predetermined frequency from a PWM generator 1418. Thus, the CRC image analysis module 1414 data may be used by the rising edge phase shift module 1424 to determine how much to shift the rising edge of the PWM signal, while the data from the display frame buffer 1416 may be used to adjust the duration of the resulting PWM The resulting phase-shifted and duration-adjusted PWM signal may be supplied to a control terminal of an input transconductance device 1432, As shown the input transconductance device 1432 may be a p-channel enhancement type MOSFET, although other types of FETs may be used. Thus, the altered PWM signal may be supplied to the gate of the MOSFET 1432. The source of the MOSFET 1432 may be connected with the power supply Vcc. The drain of the MOSFET 1432 may be connected with an output of a comparator 1438 and with the control terminal of another MOSFET 1436. The inputs of the comparator 1438 may be a predetermined bias voltage and a voltage that is dependent on the altered PWM signal. The source of the MOSFET 1432 (and thus PWM signal) is coupled to one end of a resistor 1434 and the other end of the resistor 1434 may be coupled to another input of the comparator 1438 and the source of the other MOSFET 1436. The drain of the other MOSFET 1436 may be coupled to an amplifier 1440 before being supplied to the LEDs 1442. The drain of the other MOSFET 1436 may also be coupled to a switch 1444 to supply a feedback voltage to the control 1410, as also indicated in FIG. 1.

Figure 15:
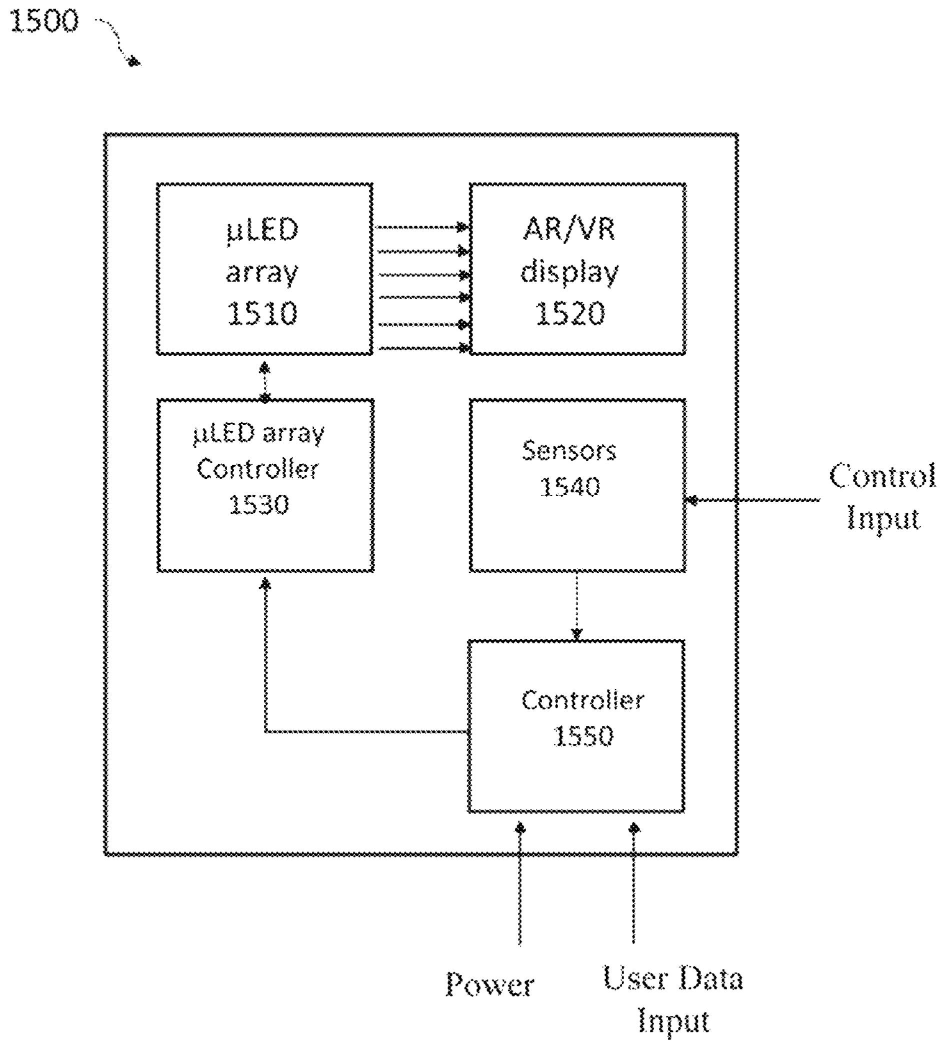
FIG. 15 illustrates an example system, according to some embodiments of the present disclosure.

Applications supported by μLED arrays include both augmented reality (AR) and virtual reality (VR). Various types of devices may be used to provide AR/VR to users, including headsets, glasses, and projectors. FIG. 15 illustrates an example system, according to some embodiments of the present disclosure. In particular, FIG. 15 illustrates an AR/VR system 1500 with components similar to those described above. The AR/VR system 1500 includes a μLED array 1510, AR or VR display 1520, μLED array controller 1530, sensors 1540, and system controller 1550. The AR/VR system 1500 components can be disposed in a single structure, or one or more of the components shown can be mounted separately. For example, a first set of components, the μLED array 1510, AR or VR display 1520, and sensors 1540 can be mounted on a single device, such as those above, while a second set of components, the μLED array controller 1530 and/or system controller 1550, may be disposed separately from the first set of components and connected via wireless communication. Although certain components are shown, other components may be present for functionality but are not described for convenience. Similarly, one or more of the components shown in FIG. 15 may be combined or eliminated entirely.

Power and user data are provided to the system controller 1550. The user data input can include information provided by audio instructions, haptic feedback, eye or pupil positioning, or connected keyboard, mouse, or game controller. The system controller 1550 controls the μLED array controller 1530 based on signals from the sensors 1540. The sensors 1540 may include cameras, depth sensors, audio sensors, accelerometers, two or three axis gyroscopes and other types of motion and/or environmental/wearer sensors. The sensors 1540 are configured to receive a control input. Other sensors can include but are not limited to air pressure, stress sensors, temperature sensors, or any other suitable sensors needed for local or remote environmental monitoring. In some embodiments, the control input can include detected touch or taps, gestural input, or control based on headset or display position. As another example, based on the one or more measurement signals from one or more gyroscope or position sensors that measure translation or rotational movement, an estimated position of the AR/VR system 1500 relative to an initial position can be determined.

As above, the μLED array 1510 can support microLED pixel arrays with hundreds, thousands, or even millions of light emitting LEDs positioned together on centimeter scale area substrates or smaller. The μLED array 1510 can be monochromatic, RGB, or other desired chromaticity. The pixels of the μLED array 1510 can be square, rectangular, hexagonal, or have curved perimeter. Pixels can be of the same size, of differing sizes, or similarly sized and grouped to present larger effective pixel size and controlled via the CMOS backplane, for example. In some embodiments, separate μLED arrays can be used to provide display images, with AR features being provided by a distinct and separate μLED array.

In some embodiments, the μLED array controller 1530 may control one group of pixels to be used for displaying content (AR/VR and/or non-AR/VR) to the user while controlling another group of pixels to be used as tracking pixels for providing tracking light used in eye tracking to adjust the content. Content display pixels are designed to emit light within the visible band (approximately 400 nm to 780 nm). Tracking pixels may be designed to emit visible light and/or light in the IR band (approximately 780 nm to 2,200 nm). In some embodiments, the tracking pixels and content pixels may be simultaneously active. In some embodiments, the tracking pixels may be controlled to emit tracking light during a time period that content pixels are deactivated and are thus not displaying content to the user.

In some embodiments, the μLED pixels and circuitry supporting μLED array 1510 can be packaged and include a submount or printed circuit board for powering and controlling light production by the μLEDs. The printed circuit board supporting the μLED array 1510 may include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer may be formed over the substrate material, and a metal electrode pattern formed over the insulating layer for contact with the μLED array 1510. The submount can act as a mechanical support, providing an electrical interface between electrodes on the μLED array 1510 and a power supply, and also provide heat sink functionality.

The AR/VR system 1500 can incorporate optics in the μLED array 1510 and/or AR/VR display 1520, for example to couple light emitted by μLED array 1510 into AR/VR display 1520. In some embodiments, the optical elements may be, for example, a plano concave or convex lens or a Fresnel lens or any other suitable optical element that affects the directionality of the light from the μLED array 1510. Each optical element can have at least one coating, such as a UV blocking or anti-reflective coating. In some embodiments, the optical elements may be designed to polarize the light transmitted therethrough. The optical elements in other embodiments include one an aperture and/or filter in addition to or instead of the above lenses. The optical elements can be used to magnify and/or correct images, such as correction or minimization of various two-or three-dimensional optical errors.

In one embodiment, the μLED array controller 1530 may provide power and real time control for the light emitting array 1510. For example, the μLED array controller 1530 may implement individual pixel-level or group pixel-level control of amplitude and duty cycle. The μLED array controller 1530 may contain a frame buffer for holding generated or processed images that can be supplied to the μLED array 1510. The μLED array controller 1530 and/or system controller 1550 may include digital control interfaces such as an Inter-Integrated Circuit serial bus, Serial Peripheral Interface (SPI), USB-C, HDMI, Display Port, or other suitable image or control modules that are configured to transmit image data, control data or instructions.

In operation, pixels in the images can be used to define response of the μLED array 1510, with intensity and spatial modulation of LED pixels being based on the images). To reduce data rate issues, groups of pixels (e.g. square blocks of Y×Y pixels) can be controlled as single blocks. In some embodiments, high speed and high data rate operation is supported, with pixel values from successive images able to be loaded as successive frames in an image sequence at a rate between 30 Hz and 100 Hz, with 60 Hz being typical but 27 Hz being essentially a minimum. Pulse width modulation can be used to control each pixel to emit light in a pattern and with an intensity at least partially dependent on the image.

In some embodiments, the system controller 1550 may use data from the sensors 1540 to integrate measurement signals received from the accelerometers over time to estimate a velocity vector and integrate the velocity vector over time to determine an estimated position of a reference point for the AR/VR system 1500. In other embodiments, the reference point used to describe the position of the AR/VR system 1500 can be based on depth sensor, camera positioning views, or optical field flow. Based on changes in position, orientation, or movement of the AR/VR system 1500, the system controller 1550 can send images or instructions the light emitting array controller 1530. Changes or modification the images or instructions can also be made by user data input, or automated data input.

Select Examples

Example 1 is a complementary metal oxide semiconductor (CMOS) die for controlling pixels of a light-emitting diode (LED) array, the CMOS die comprising: a digital interface to provide control signals to the LED array; and logic coupled to the digital interface, the logic configured to: determine duty cycles for each pixel of the pixels based on image data to display an image using the pixels; segment the pixels into at least first pixels of a first group and second pixels of a second group based on duty cycles of the pixels, the duty cycles of the first pixels being different from the duty cycles of the second pixels; and determine first turn-on delays for the first pixels based on a first number of the first pixels and second turn-on delays for the second pixels based on a second number of the second pixels for activation of the first pixels and the second pixels in accordance with the first and second turn-on delays, respectively, using the control signals to display the image.

In Example 2, the subject matter of Example 1 includes, wherein: the duty cycles of the first pixels are within a first range of duty cycles, the duty cycles of the second pixels are within a second range of duty cycles, and the first range of duty cycles is separate from the second range of duty cycles.

In Example 3, the subject matter of Examples 1-2 includes, wherein: each of the first pixels has a unique first order number, each of the second pixels has a unique second order number, and the logic is further configured to: divide a period of a cycle by the first number to produce a first delay increment and multiply the first delay increment by the unique first order number for each of the first pixels to produce the first turn-on delay for each of the first pixels; and divide the period of the cycle by the second number to produce a second delay increment and multiply the second delay increment by the unique second order number for each of the second pixels to produce at least a portion of the second turn-on delays.

In Example 4, the subject matter of Example 3 includes, wherein the logic is further configured to: determine each first order number based on a position of the associated first pixel within the LED array; and determine each second order number based on a position of the associated second pixel within the LED array.

In Example 5, the subject matter of Examples 3-4 includes, wherein the logic is further configured to: determine a shift for the second group, the shift for the second group being equal to a smaller of the first and second delay increment; and add the shift to the turn-on delays produced by the multiplication to produce the second turn-on delays.

In Example 6, the subject matter of Examples 1-5 includes, μm.

Example 7 is a light-emitting diode (LED) structure comprising: a complementary metal oxide semiconductor (CMOS) die configured to provide control signals based on image data of an image; and a LED array comprising pixels, the pixels segmented into at least first pixels of a first group and second pixels of a second group based on duty cycles of the pixels, first turn-on delays of the first pixels based on a first number of the first pixels, second turn-on delays of the second pixels based on a second number of the second pixels, the first pixels and the second pixels configured to be activated in accordance with the first and second turn-on delays, respectively, using the control signals to display the image.

In Example 8, the subject matter of Example 7 includes, wherein: each of the pixels within the first group of pixels has a unique first order number, each of the pixels within the second group of pixels has a unique second order number, and the turn-on delays for the pixels within the first group of pixels is a period of a cycle divided by the number of the pixels within the first group of pixels to produce a first delay increment and the first delay increment multiplied by the unique first order number to produce the turn-on delay for the pixel, and the turn-on delays for the pixels within the second group of pixels is the period of the cycle divided by the number of the pixels within the second group of pixels to produce a second delay increment and the second delay increment multiplied by the unique second order number to produce at least a portion of the turn-on delay for the pixel.

In Example 9, the subject matter of Example 8 includes, wherein: the unique first order number for each of the pixels within the first group of pixels is determined based on a position of the pixel within the LED array relative to other pixels within the first group of pixels; and the unique second order number for each of the pixels within the second group of pixels is determined based on a position of the pixel within the LED array relative to other pixels within the second group of pixels.

In Example 10, the subject matter of Examples 8-9 includes, wherein a first pixel within the first group of pixels and a first pixel within the second group of pixels are configured to be simultaneously activated.

In Example 11, the subject matter of Examples 8-10 includes, wherein: a shift is applied to the turn-on delays for the pixels within the second group of pixels to determine the turn-on delays for the pixels within the second group of pixels, and the shift for the second group is equal to a smaller of the first and second delay increment.

In Example 12, the subject matter of Examples 7-11 includes, a pulse width modulation (PWM) generator to generate a PWM signal in accordance with the determined turn-on delays and the duty cycles of the plurality of pixels, the PWM signal causing PWM switches corresponding to plurality of pixels to activate and deactivate.

In Example 13, the subject matter of Examples 7-12 includes, an LED die that includes the LED array.

In Example 14, the subject matter of Examples 7-13 includes, μm.

In Example 15, the subject matter of Examples 7-14 includes, wherein LEDs of the LED array are independently-controllable.

Example 16 is a vehicle headlamp system, comprising: a printed circuit board including a micrologic configured to produce data for light to be produced by the vehicle headlamp system; an LED die having a light emitting diode (LED) array, the LED array containing a plurality of pixels; and a complementary metal oxide silicon (CMOS) backplane coupled to the printed circuit board and the LED die, the CMOS backplane configured to: determine duty cycles for the plurality of pixels based on the data; determine turn-on times for pixels of the plurality of pixels within a first group based on a first number of the pixels within the first group, the first group having duty cycles within a first range; and determine turn-on times for pixels within a second group based on a second number of the pixels within the second group, the second group including having duty cycles within a second range.

In Example 17, the subject matter of Example 16 includes, wherein: each of the pixels within the first group has a unique first order number, each of the pixels within the second group has a unique second order number, and the CMOS backplane is further configured to: divide a period of a cycle by the first number to produce a first delay increment and, for each of the pixels within the first group, multiply the first delay increment by the unique first order number to produce the turn-on time for the pixel; and divide the period of the second number to produce a second delay increment and, for each of the pixels within the second group, multiply the second delay increment by the unique second order number to at least partially produce the turn-on time for the pixel.

In Example 18, the subject matter of Example 17 includes, wherein the CMOS backplane is further configured to: determine each first order number based on a position of the associated pixel within the first group; and determine each second order number based on a position of the associated pixel within the second group.

In Example 19, the subject matter of Examples 17-18 includes, wherein to determine the turn-on times for the pixels within the second group, the CMOS backplane is further configured to: determine a shift for the second group, the shift for the second group being equal to a smaller of the first and second delay increment; and add the shift to the turn-on times produced by the multiplication of the second delay increment by the unique second order number to produce the second turn-on times.

In Example 20, the subject matter of Examples 16-19 includes, wherein: the CMOS backplane comprises: a pulse width modulation (PWM) generator to generate PWM signals; and a plurality of PWM switches corresponding to the plurality of pixels, the plurality of PWM switches configured to control current flow through the plurality of pixels, the CMOS backplane is further configured to activate the plurality of pixels on in accordance with the turn-on times through generation, by the PWM generator, of a plurality of PWM signals in accordance with the turn-on times, and the plurality of PWM signals are configured to activate and deactivate the plurality of PWM switches in accordance with the turn-on times.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits of the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, components and/or procedures described herein (such as the control 114 (FIG. 1)) may be implemented in one or more silicon cores in Application Specific integrated Circuits (ASICs), Field Programmable Gate Arrays (FPGAs), and other semiconductor chips.

It is also important to note that the functions related to components and/or procedures described herein (such as the control 114 (FIG. 1) and/or the procedure 900 (FIG. 9)) may illustrate some of the possible functions that may be executed by, or within, the systems described herein. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

The invention claimed is:

1. A complementary metal oxide semiconductor (CMOS) die for controlling pixels of a light-emitting diode (LED) array, the CMOS die comprising:

a digital interface to provide control signals to the LED array; and logic coupled to the digital interface, the logic configured to:

determine duty cycles for each pixel of the pixels based on image data to display an image using the pixels;

segment the pixels into at least first pixels of a first group and second pixels of a second group based on duty cycles of the pixels, the duty cycles of the first pixels being different from the duty cycles of the second pixels; and determine first turn-on delays for the first pixels based on a first number of the first pixels and second turn-on delays for the second pixels based on a second number of the second pixels for activation of the first pixels and the second pixels in accordance with the first and second turn-on delays, respectively, using the control signals to display the image, wherein LEDs of the LED array are independently-controllable and have lateral dimensions of less than about 100 μm.

2. The CMOS die of claim 1, wherein:

the duty cycles of the first pixels are within a first range of duty cycles, the duty cycles of the second pixels are within a second range of duty cycles, and the first range of duty cycles is separate from the second range of duty cycles.

3. The CMOS die of claim 1, wherein:

each of the first pixels has a unique first order number, each of the second pixels has a unique second order number, and the logic is further configured to:

divide a period of a cycle by the first number to produce a first delay increment and multiply the first delay increment by the unique first order number for each of the first pixels to produce the first turn-on delay for each of the first pixels; and divide the period of the cycle by the second number to produce a second delay increment and multiply the second delay increment by the unique second order number for each of the second pixels to produce at least a portion of the second turn-on delays.

4. The CMOS die of claim 3, wherein the logic is further configured to:

determine each first order number based on a position of the associated first pixel within the LED array; and determine each second order number based on a position of the associated second pixel within the LED array.

5. The CMOS die of claim 3, wherein the logic is further configured to:

determine a shift for the second group, the shift for the second group being equal to a smaller of the first and second delay increment; and add the shift to the turn-on delays produced by the multiplication to produce the second turn-on delays.

6. A light-emitting diode (LED) structure comprising:

a complementary metal oxide semiconductor (CMOS) die configured to provide control signals based on image data of an image; and a LED array comprising pixels, the pixels segmented into at least first pixels of a first group and second pixels of a second group based on duty cycles of the pixels, first turn-on delays of the first pixels based on a first number of the first pixels, second turn-on delays of the second pixels based on a second number of the second pixels, the first pixels and the second pixels configured to be activated in accordance with the first and second turn-on delays, respectively, using the control signals to display the image, wherein each pixel of the plurality of pixels has a lateral dimension of less than 100 μm.

7. The LED structure of claim 6, wherein:

each of the pixels within the first group of pixels has a unique first order number, each of the pixels within the second group of pixels has a unique second order number, the turn-on delays for the pixels within the first group of pixels is a period of a cycle divided by a number of the pixels within the first group of pixels to produce a first delay increment and the first delay increment multiplied by the unique first order number to produce, for each pixel within the first group of pixels, the turn-on delay for the pixel, and the turn-on delays for the pixels within the second group of pixels is the period of the cycle divided by a number of the pixels within the second group of pixels to produce a second delay increment and the second delay increment multiplied by the unique second order number to produce, for each pixel within the second group of pixels, at least a portion of the turn-on delay for the pixel.

8. The LED structure of claim 7, wherein:

the unique first order number for each of the pixels within the first group of pixels is determined based on a position of the pixel within the LED array relative to other pixels within the first group of pixels; and the unique second order number for each of the pixels within the second group of pixels is determined based on a position of the pixel within the LED array relative to other pixels within the second group of pixels.

9. The LED structure of claim 7, wherein a first pixel within the first group of pixels and a first pixel within the second group of pixels are configured to be simultaneously activated.

10. The LED structure of claim 7, wherein:

a shift is applied to the turn-on delays for the pixels within the second group of pixels to determine the turn-on delays for the pixels within the second group of pixels, and the shift for the second group is equal to a smaller of the first and second delay increment.

11. The LED structure of claim 6, further comprising a pulse width modulation (PWM) generator to generate a PWM signal in accordance with the turn-on delays and the duty cycles of the plurality of pixels, the PWM signal causing PWM switches corresponding to plurality of pixels to activate and deactivate.

12. The LED structure of claim 6, further comprising an LED die that includes the LED array.

13. The LED structure of claim 6, wherein LEDs of the LED array are independently-controllable.

* * * * *